(12) United States Patent
Takura et al.

(10) Patent No.: US 12,348,665 B2
(45) Date of Patent: Jul. 1, 2025

(54) PROGRAM, INFORMATION PROCESSING DEVICE, AND INFORMATION PROCESSING METHOD

(71) Applicant: Sony Group Corporation, Tokyo (JP)

(72) Inventors: Kento Takura, Tokyo (JP); Keiko Hiraoka, Tokyo (JP); Kumiko Tsukahara, Tokyo (JP); Fumihiko Nishio, Tokyo (JP); Hyumin Seul, Tokyo (JP); Sho Kobayashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 42 days.

(21) Appl. No.: 17/799,264

(22) PCT Filed: Feb. 21, 2020

(86) PCT No.: PCT/JP2020/007005
§ 371 (c)(1),
(2) Date: Aug. 12, 2022

(87) PCT Pub. No.: WO2021/166213
PCT Pub. Date: Aug. 26, 2021

(65) Prior Publication Data
US 2024/0187514 A1     Jun. 6, 2024

(51) Int. Cl.
H04W 24/02    (2009.01)
H04M 1/72454  (2021.01)
H04M 1/72469  (2021.01)
H04W 88/02    (2009.01)

(52) U.S. Cl.
CPC ... H04M 1/72454 (2021.01); H04M 1/72469 (2021.01)

(58) Field of Classification Search
CPC ......... H04M 1/72454; H04M 1/72469; H04M 1/72466
USPC ....................................................... 455/418
See application file for complete search history.

(56) References Cited

U.S. PATENT DOCUMENTS

2014/0165000 A1* 6/2014 Fleizach ............... G06F 3/0488
715/810

FOREIGN PATENT DOCUMENTS

JP    2017-188833 A    10/2017

OTHER PUBLICATIONS

IP.com (Year: 2024).*

(Continued)

*Primary Examiner* — Moustapha Diaby
(74) *Attorney, Agent, or Firm* — XSENSUS LLP

(57) ABSTRACT

An information processing device performs a process of changing, during activation of a first application, a plurality of functions of other than the first application executed by the information processing device to a state where collective restriction is performed according to a first condition, and a process of returning to a state before the collective restriction according to a second condition are executed.

20 Claims, 14 Drawing Sheets

(56) References Cited

OTHER PUBLICATIONS

ProQuest search (Year: 2024).*
International Search Report and Written Opinion mailed on Jul. 28, 2020, received for PCT Application PCT/JP2020/007005, filed on Feb. 21, 2020, 6 pages including English Translation.
Takada, "How to turn off notification center feature on iPhone! Dramatically reduced erroneous operation during the game", Your Own Switch-Pressing Blog, Available Online At: https://bamka.info/iphone-tsuchi-orosanai, Oct. 25, 2019, pp. 1-16 (32 pages including English Translation).

* cited by examiner

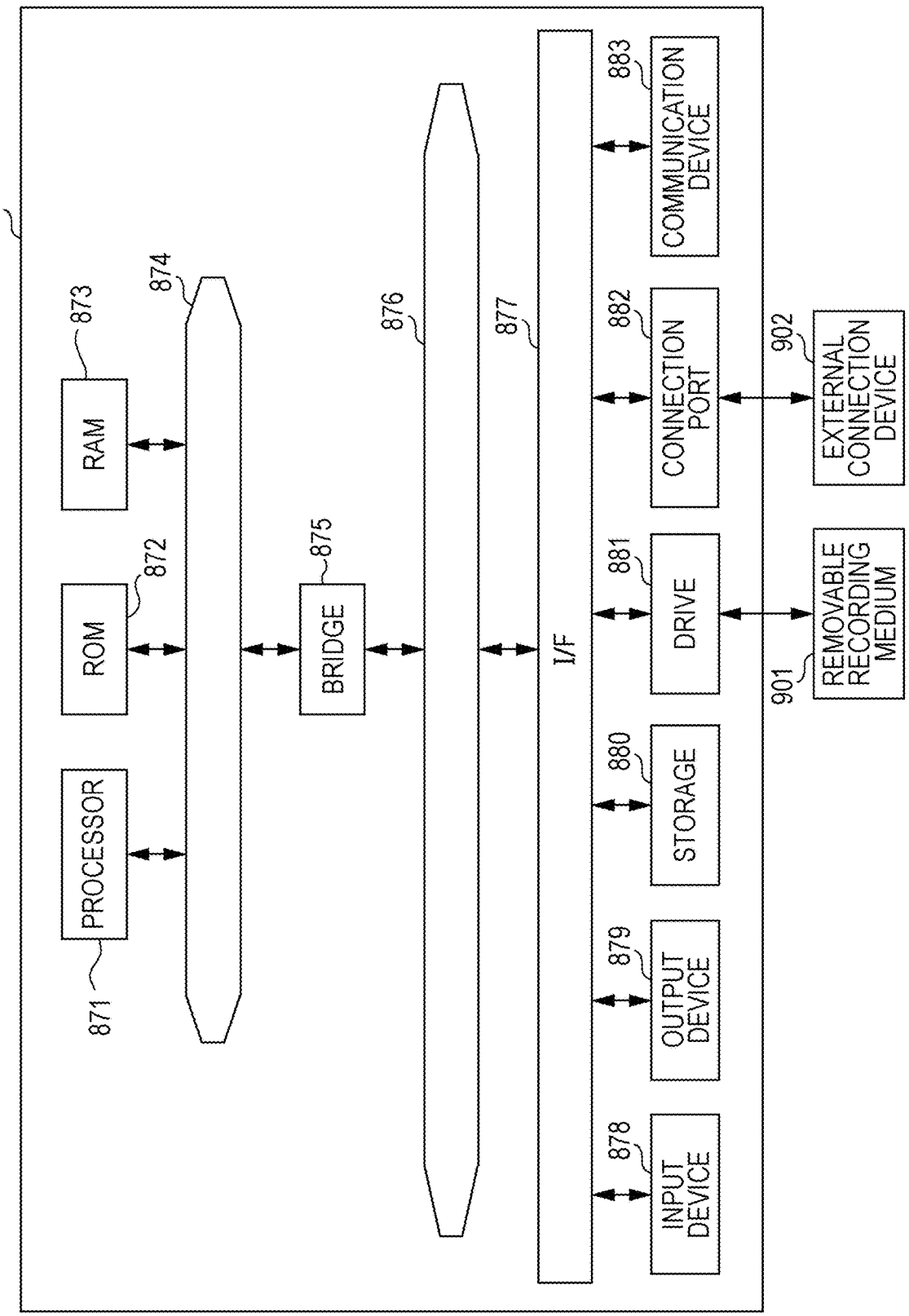

PROGRAM, INFORMATION PROCESSING DEVICE, AND INFORMATION PROCESSING METHOD

CROSS-REFERENCE TO RELATED APPLICATION

The present application is based on PCT filing PCT/JP2020/007005, filed Feb. 21, 2020, the entire content of each is incorporated herein by reference.

TECHNICAL FIELD

The present disclosure relates to a program, an information processing device, and an information processing method, and particularly relates to processing of function setting.

BACKGROUND ART

In recent years, a user installs various applications in a terminal device such as a personal computer or a smartphone, and obtains user experiences using not only one application but also a plurality of applications in combination.

For example, the user images a moving image or an image of the play screen of a game application with the application. The imaged moving image or image is subjected to processing or the like by another application, and then distributed online or published on a website via a web service or another application. In this way, the user tries to obtain a new user experience by using another application so as to extend one application.

CITATION LIST

Patent Document

Patent Document 1: Japanese Patent Application Laid-Open No. 2017-188833

SUMMARY OF THE INVENTION

Problems to be Solved by the Invention

Incidentally, for the user who enjoys the game application on the terminal device, it may be undesirable to perform notification and display by another application on the game screen, activation of another application by an unconscious operation, or the like.

For example, for a user who is concentrating on a game, a notification of a message or an incoming call on the game screen not only distracts the user, but may also hinder the progress of the game.

On the other hand, the feeling that such other functions are unnecessary varies depending on the status of the user. For example, in a case where a game is played while waiting for a message or an incoming call in a waiting time, notification of an incoming call or the like is necessary. Thus, an operation of restricting unnecessary functions only when the user wants to concentrate on the game is troublesome for the user.

Note that such a problem is not limited to a case where a specific application such as a game application is used, and it is assumed that such a problem similarly occurs in a case where the user uses various applications in combination.

Accordingly, the present disclosure proposes a technique for easily restricting other unnecessary functions during activation of a specific application such as a game.

Solutions to Problems

A program according to the present technology is a program that causes an information processing device to execute a process of changing, during activation of a first application, a plurality of functions of other than the first application executed by the information processing device to a state where collective restriction is performed according to a first condition, and a process of returning to a state before the collective restriction according to a second condition.

An information processing method according to the present technology is an information processing method in which an information processing device executes the above processing.

An information processing device according to the present technology includes a function restriction unit configured to perform a process of changing, during activation of a first application, a plurality of functions of other than the first application executed by the information processing device to a state where collective restriction is performed according to a first condition, and a process of returning to a state before the collective restriction according to a second condition.

For example, a program as a second application that executes an extended function during activation of a game application corresponding to the first application, or the like is assumed. This program performs a process of bringing a plurality of functions of the information processing device to a state where collective restriction is performed during execution of a game application or the like.

In the program, the information processing method, or the information processing device according to the present technology described above, it is conceivable that at least one of the first condition or the second condition is detection of a user operation related to collective restriction.

Processing of the collective restriction is executed in response to the user operation, or the collective restriction is ended.

In the program, the information processing method, or the information processing device according to the present technology described above, it is conceivable that a menu is superimposed and displayed on an image by the first application, a collective restriction operator for instructing collective restriction is displayed on the menu, and at least one of the first condition or the second condition is detection of a user operation on the collective restriction operator.

An operator for executing the collective restriction processing by a user operation is displayed in, for example, a menu superimposed and displayed on a screen of a first application such as a game.

In the program, the information processing method, or the information processing device according to the present technology described above, it is conceivable that an operation of instructing the collective restriction or an operation of releasing the collective restriction by a user is enabled by a plurality of operation procedures.

For example, it is possible to operate a plurality of lines of procedures as an operation procedure that can be operated to enable an instruction of collective restriction in three steps, an operation procedure that can be operated in two steps, or the like.

In the program, the information processing method, or the information processing device according to the present technology described above, it is conceivable that the first condition is detection of a start timing of a predetermined operation in the first application.

The processing of the collective restriction is executed in response to detection of a start of a game of the first application such as a game.

In the program, the information processing method, or the information processing device according to the present technology described above, it is conceivable that the second condition is detection of an end timing of a predetermined operation in the first application.

The collective restriction is released, for example, in response to detection of an end of a game of the first application such as a game, or the like.

In the program, the information processing method, or the information processing device according to the present technology described above, it is conceivable that the plurality of functions that is a target of the collective restriction includes a function that causes a transition from the first application to another application.

For example, during a game of the first application, another application is prevented from being activated with the first application as the background.

In the program, the information processing method, or the information processing device according to the present technology described above, it is conceivable that the plurality of functions that is a target of the collective restriction includes a notification function.

For example, notification of an electronic mail, a message, an incoming call, or the like is not performed during a game.

In the program, the information processing method, or the information processing device according to the present technology described above, it is conceivable that the plurality of functions that is a target of the collective restriction includes an operation function.

For example, during a game, operations of various keys, touch operations, and the like provided in the information processing device (for example, a terminal device) are invalidated.

In the program, the information processing method, or the information processing device according to the present technology described above, it is conceivable that the plurality of functions that is a target of the collective restriction is selected on the basis of instruction information corresponding to learning data for each type of the first application.

For example, operation statuses of a large number of users are learned for each game type, genre, and the like, and the functions that are the targets of the collective restriction according to the game are customized.

BRIEF DESCRIPTION OF DRAWINGS

FIG. 15 is a block diagram of a hardware configuration of the information processing device of the embodiment.

MODE FOR CARRYING OUT THE INVENTION

Figure 1:
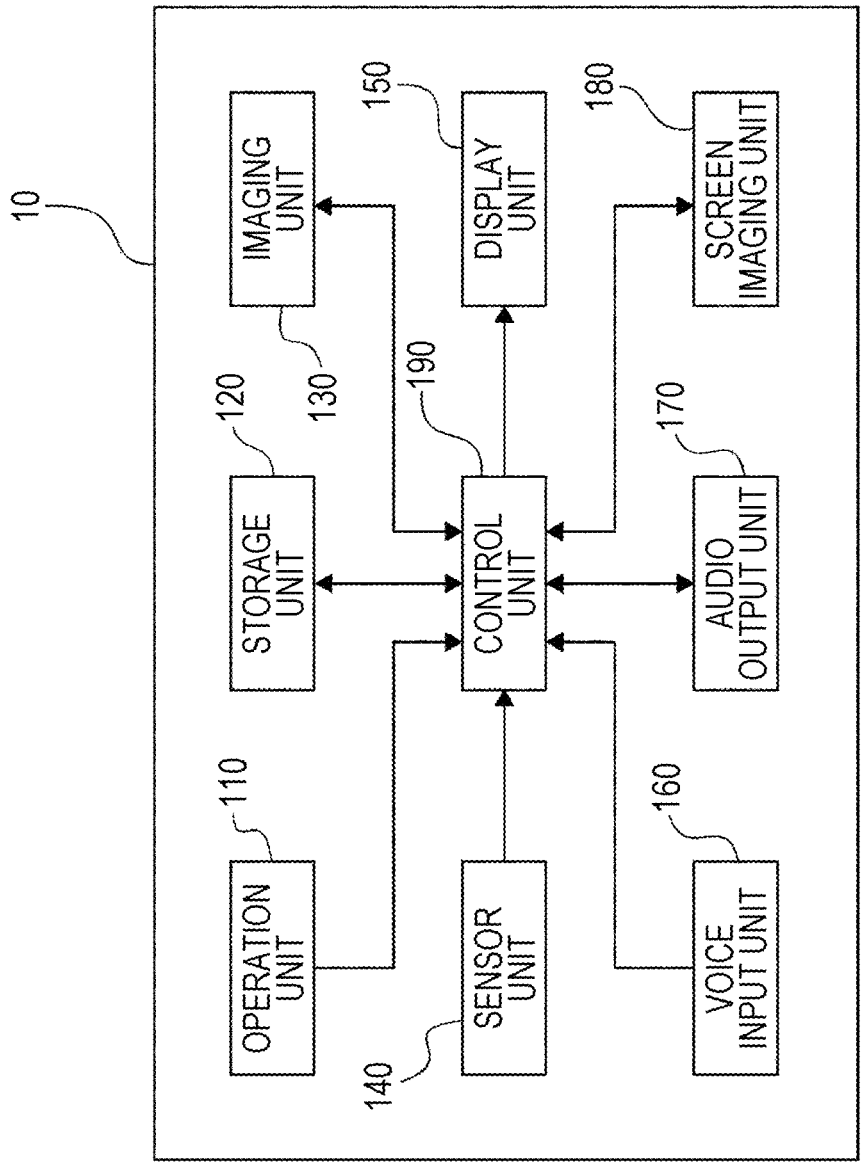
FIG. 1 is a block diagram of an information processing device of an embodiment of the present technology.

Hereinafter, embodiments will be described in the following order.
<1. Functional Configuration>
<2. Manual Setting Processing Example>
<3. Learning Processing and Automatic Setting>
<4. Hardware Configuration Example>
<5. Summary and Modification Example>

Note that, in the present description and the drawings, substantially the same parts are denoted by the same reference numerals, and redundant description will be omitted.

Furthermore, in the following description and drawings, an "application" may be simply abbreviated as an "app".

1. Functional Configuration

First, a functional configuration example of the information processing device 10 according to the present embodiment will be described.

The information processing device 10 may be a mobile terminal such as a smartphone or a tablet personal computer (PC) capable of executing various applications, or may be a stationary terminal installed at the user's home, company, or the like.

FIG. 1 is a block diagram illustrating a functional configuration example of an information processing device according to the present embodiment. As illustrated in FIG. 1, the information processing device 10 according to the present embodiment includes an operation unit 110, a storage unit 120, an imaging unit 130, a sensor unit 140, a display unit 150, a voice input unit 160, an audio output unit 170, a screen imaging unit 180, and a control unit 190.

(Operation Unit 110)

The operation unit 110 according to the present embodiment detects various operations by the user, such as a device operation for an application. Examples of the above-described device operation include a touch operation, insertion of an earphone terminal into the information processing device 10, and the like. Here, the touch operation refers to various touch operations on the display unit 150, such as tapping, double tapping, swiping, and pinching. Furthermore, the touch operation includes an operation of bringing an object such as a finger close to the display unit 150, for example. For this purpose, the operation unit 110 according to the present embodiment includes, for example, a touch panel, a button, a keyboard, a mouse, a proximity sensor, and the like. The operation unit 110 according to the present embodiment inputs information related to a detected operation of the user to the control unit 190.

(Storage Unit 120)

The storage unit 120 according to the present embodiment is a storage area for temporarily or permanently storing various programs and data. For example, the storage unit 120 may store programs and data for the information processing device 10 to execute various functions. As a specific example, the storage unit 120 may store a program for executing various applications, management data for managing various settings, and the like. Of course, the above is merely an example, and the type of data stored in the storage unit 120 is not particularly limited.

(Imaging Unit 130)

The imaging unit 130 according to the present embodiment images, for example, the face or the like of the user who operates the information processing device on the basis of control by the control unit 190. For this purpose, the imaging unit 130 according to the present embodiment includes an imaging element. A smartphone, which is an example of the information processing device 10, includes a front camera for imaging a user's face or the like on the display unit 150 side and a main camera for imaging a landscape or the like on the back side of the display unit 150, and in the present embodiment, imaging by the front camera is controlled as an example.

(Sensor Unit 140)

The sensor unit 140 according to the present embodiment has a function of collecting sensor information regarding user's behavior using various sensors. The sensor unit 140 includes, for example, an acceleration sensor, a gyro sensor, a geomagnetic sensor, a vibration sensor, a global navigation satellite system (GNSS) signal reception device, and the like. For example, the sensor unit 140 detects that the user holds the information processing device 10 sideways by using a gyro sensor, and inputs detected information to the control unit 190.

(Display Unit 150)

The display unit 150 according to the present embodiment displays various types of visual information on the basis of control by the control unit 190. The display unit 150 according to the present embodiment may display, for example, an image, a character, or the like related to an application. For this purpose, the display unit 150 according to the present embodiment can include various display devices such as a liquid crystal display (LCD) device and an organic light emitting diode (OLED) display device. Furthermore, the display unit 150 can also superimpose and display a UI of another application on a layer higher than the screen of the application being displayed.

(Voice Input Unit 160)

The voice input unit 160 according to the present embodiment collects a voice or the like uttered by the user on the basis of control by the control unit 190. For this purpose, the voice input unit 160 according to the present embodiment includes a microphone and the like.

(Audio Output Unit 170)

The audio output unit 170 according to the present embodiment outputs various sounds. The audio output unit 170 according to the present embodiment outputs, for example, a voice or a sound according to the status of the application on the basis of control by the control unit 190. For this purpose, the audio output unit 170 according to the present embodiment includes a speaker and an amplifier.

(Screen Imaging Unit 180)

The screen imaging unit 180 according to the present embodiment images a screenshot (SS) of the screen or a moving image displayed on the display unit 150 on the basis of control by the control unit 190, and stores the images in the storage unit 120.

(Control Unit 190)

The control unit 190 according to the present embodiment controls each component included in the information processing device 10. Furthermore, the control unit 190 according to the present embodiment can control function extension on an application and restrict various functions.

Note that the function extension on the application is performed by another application. In order to distinguish between the application for which the function extension is performed and the another application that performs the function extension, these applications are referred to as a "first application" and an "extension application", respectively.

When performing the function extension, the control unit 190 activates the extension application in addition to the first application and simultaneously controls both applications.

Details of the functions of the control unit 190 according to the present embodiment will be described later.

Although the functional configuration example of the information processing device 10 has been described above, the functional configuration described above with reference to FIG. 1 is merely an example, and the functional configuration of the information processing device 10 according to the present embodiment is not limited to such an example.

For example, the information processing device 10 does not necessarily need to include all of the configurations illustrated in FIG. 1, and can include each configuration such as the voice input unit 160 in another device different from the information processing device 10. The functional configuration of the information processing device 10 according to the present embodiment can be flexibly modified according to specifications and operations.

Furthermore, the function of each component may be performed by reading a control program from a storage medium such as a read only memory (ROM) or a random access memory (RAM) storing a control program describing a processing procedure in which an arithmetic device such as a central processing unit (CPU) implements these functions, and interpreting and executing the program. Therefore, it is possible to appropriately change the configuration to be used according to the technical level at the time of implementing the present embodiment. Furthermore, an example of a hardware configuration of the information processing device 10 will be described later.

Next, functions of the information processing device 10 according to the present embodiment will be described.

One of features of the control unit 190 of the information processing device 10 according to the present embodiment is to control the extension application that provides extended functions to various first applications.

The first application is, for example, a game application. However, the first application is not limited to the game application, and includes various applications installed in the information processing device 10 and used by the user, such as a drawing application, an editing application, a music application for viewing a moving image, listening to music, or the like, and an application for audio recording or image recording.

According to the extension application according to the present embodiment, it is possible to easily provide the extended function to the various first applications without editing a source code or the like. Furthermore, when an extended function is provided, the extension application can operate so as not to interfere with a user operation on the first application or an operating system (OS) and behaviors of the first application.

Figure 2:
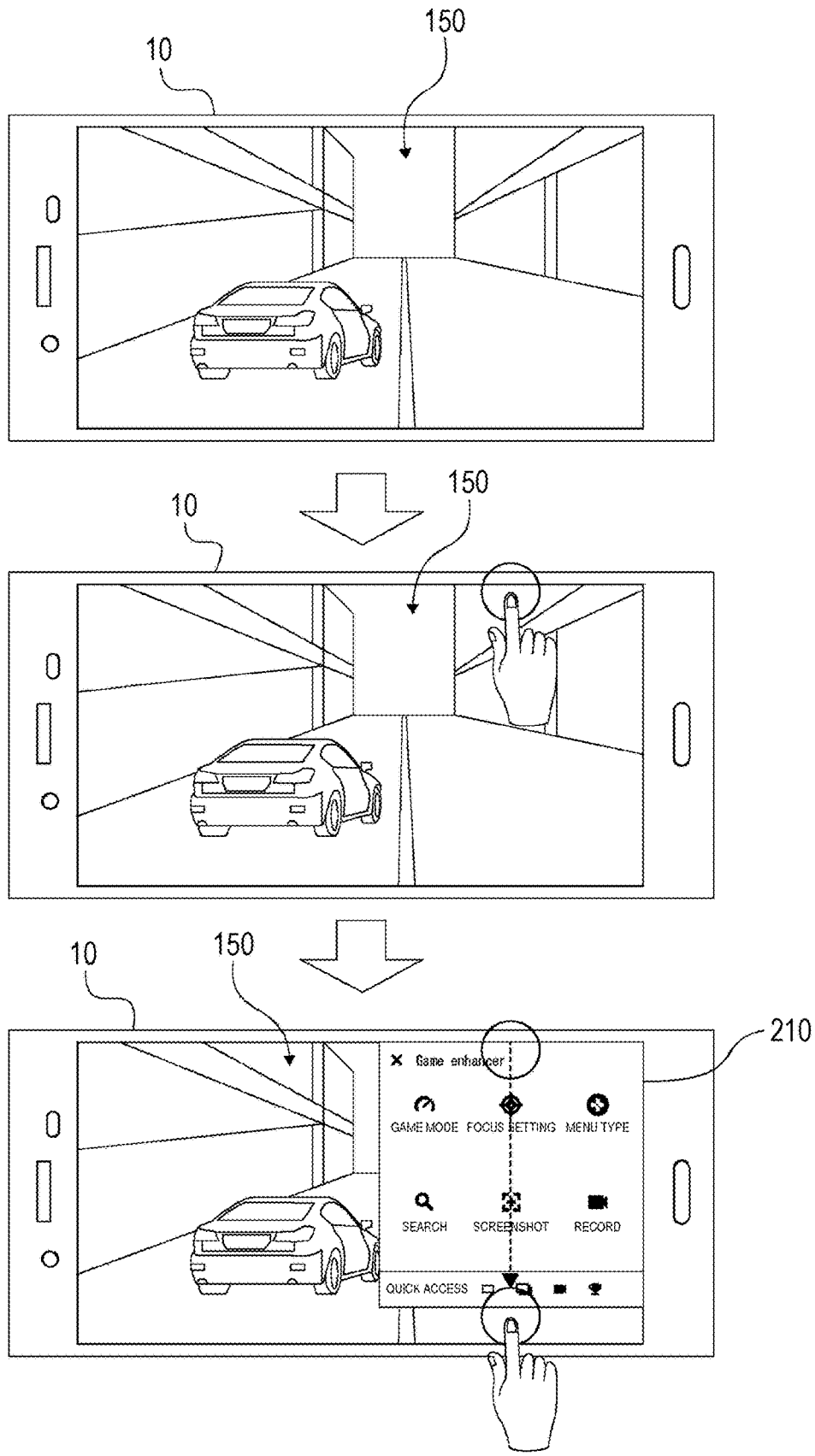
FIG. 2 is an explanatory diagram of extended function menu display of the embodiment.

FIG. 2 is a diagram illustrating an example of an operation related to menu display of the extension application according to the present embodiment.

FIG. 2 illustrates a state in which, when the information processing device 10 has been turned sideways by the user, the sensor unit 140 detects this, and the control unit 190 causes the screen on the display unit 150 to be displayed as a horizontal screen.

An upper part of FIG. 2 illustrates a state in which the control unit 190 has already activated the first application (here, the game application) and has caused the display unit 150 to display the screen of the first application on the full screen.

This upper part of FIG. 2 illustrates a state in which the user is playing the first application but is not using the extension application.

The display unit 150 in the upper part of FIG. 2 does not display any user interface (UI) of an extension application that performs function extension with respect to the first application.

The extension application may be activated by the control unit 190 upon detection of activation of the first application, or may be activated upon detection of an arbitrary operation during activation of the first application. The arbitrary operation is, for example, a user operation detected by the operation unit 110 or the sensor unit 140, a voice operation recognized by the voice input unit 160, or the like.

Furthermore, the extension application may be automatically activated along with the activation of the OS of the information processing device 10. Alternatively, the extension application may be activated by pressing an icon for the extension application displayed on the display unit 150 by a user operation or the like.

As described above, there is a case where the extension application is also being activated while the first application is being activated, but when the user is not using the extension application, for example, the UI of the extension application is not displayed.

Note that a logo or the like may be displayed when the extension application is activated, but for example, the control unit 190 performs control such that the logo is automatically displayed small after a certain period of time, control such that the logo disappears, or the like. Thus, when the user is not using the extension application, the extension application can operate so as not to interfere with the user operation on the first application or the OS and the behaviors of the first application.

A middle part of FIG. 2 illustrates a state in which the user intends to perform a touch operation on the display unit 150 in order to use the extension application.

Subsequently, a lower part of FIG. 2 illustrates a state in which, when the user has performed a swipe operation from a screen end of the display unit 150, an extended function menu 210 of the extension application is superimposed and displayed as a floating menu on the image of the first application.

The extended function menu 210 is, for example, a pull-down menu expanded from the screen end in response to movement of a swipe operation. Note that, although details will be described later, the extended function menu 210 is displayed by a predetermined operation at a predetermined position of the display unit 150. Thus, strictly speaking, the operation unit 110 detects a touch operation on the display unit 150, the detected operation and position (screen coordinates) are sent to the control unit 190, and the control unit 190 determines whether or not to display the extended function menu 210. In a case where a condition for displaying the extended function menu 210 (a predetermined operation at a predetermined position) is satisfied, the control unit 190 causes the display unit 150 to display the extended function menu 210.

Note that the touch operation for displaying the extended function menu 210 is not limited to the swipe, and may be a tap, a double tap, a pinch, or the like. Furthermore, the display position of the extended function menu 210 is not limited to an upper right portion of the display unit 150 as illustrated in the lower part of FIG. 2, and may be various positions on the display unit 150. Furthermore, the display position of the extended function menu 210 can be freely changed by the user although details thereof will be described later.

Although not illustrated, also in a case where the display unit 150 is what is called a vertical screen, as on the horizontal screen in FIG. 2, by the user performing a swipe operation on the display unit 150, the extended function menu 210 of the extension application is superimposed and displayed on the first application.

Figure 3:
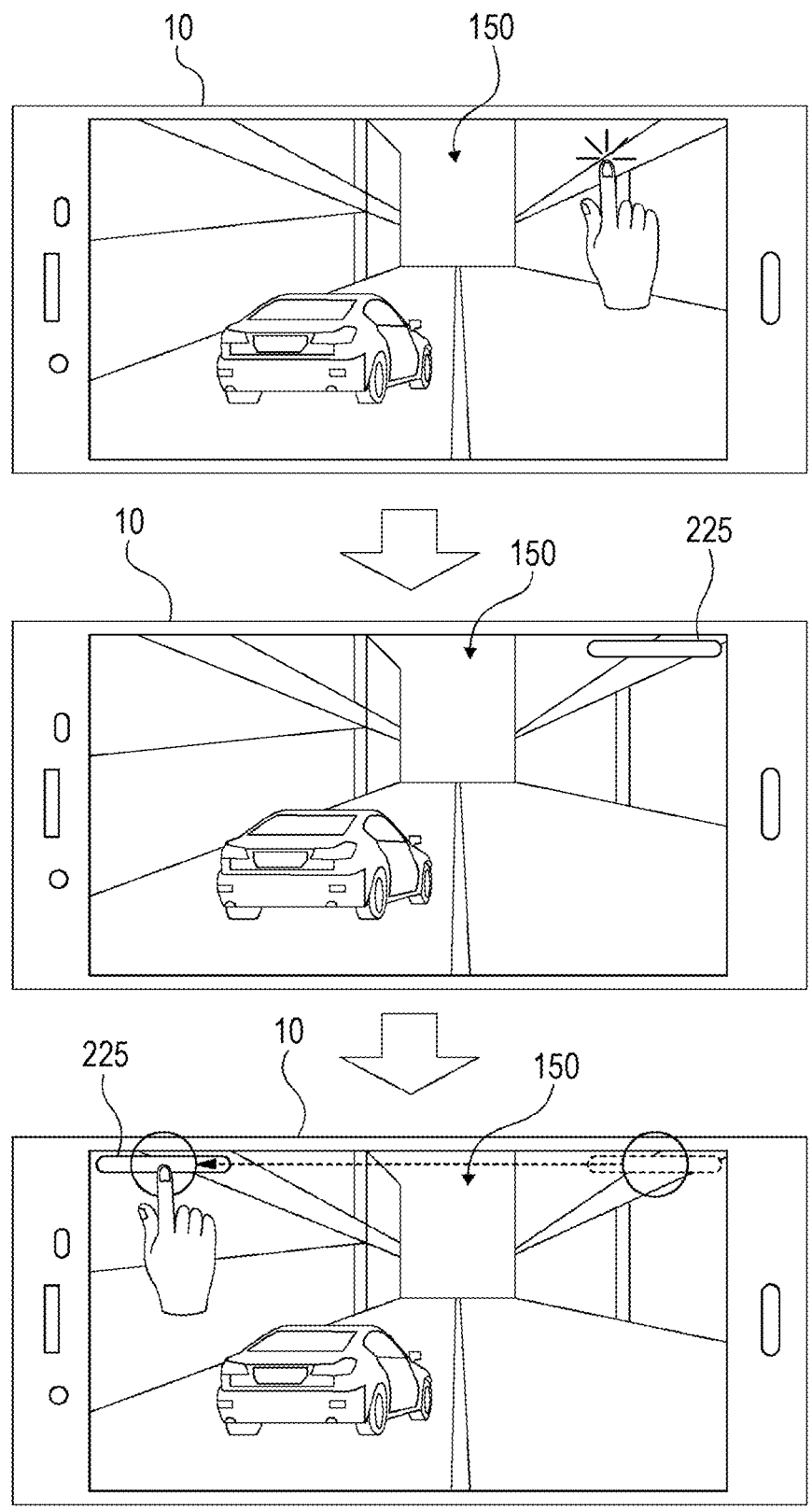
FIG. 3 is an explanatory diagram of the extended function menu display of the embodiment.

FIG. 3 is a diagram illustrating an example of an operation related to a change of a menu display position according to the present embodiment. If the display position of the extended function menu 210 of the extension application is fixed, there is a case where the user operation on the first application or the OS and the behaviors of the first application are significantly hindered. For example, there is a case where the extended function menu 210 is superimposed and displayed on an operation button or an icon of the first application, a display portion of the first application that the user always wants to see, or the like. Therefore, the display position of the extended function menu 210 of the extension application is controlled by the control unit 190 so that it can be changed freely by the user.

The upper part of FIG. 3 illustrates a state in which the user taps a predetermined position of the display unit 150 in order to change the display position of the extended function menu 210. The predetermined position here is, for example, a predetermined region near a position (middle part of FIG. 2) at which a swipe operation is started in order to expand the extended function menu 210 of FIG. 2.

The middle part of FIG. 3 illustrates a state in which a menu bar 225 of the extension application is displayed by a tap operation (the upper part of FIG. 3) on the display unit 150. Note that the touch operation for displaying the menu bar 225 is not limited to a tap. Furthermore, since the menu bar 225 is superimposed and displayed on the screen of the first application, it is desirable to have a shape, a color, a size, and a transmittance that do not hinder the screen display of the first application as much as possible. However, the menu bar 225 is not limited to such a shape or the like.

Furthermore, the extended function menu 210 as illustrated in the lower part of FIG. 2 may be expanded by performing a tap operation on the menu bar 225.

Moreover, the menu bar 225 is controlled by the control unit 190 to be in a non-display state in a case where a region other than the menu bar 225 on the display unit 150 is tapped or in a case where the menu bar 225 is not operated for a certain period of time. In this manner, the menu bar 225 is also controlled by the control unit 190 to be in a non-display state in a case of not being used by the user. Thus, the extension application can further operate so as not to interfere with the user operation on the first application or the OS and the behaviors of the first application.

A lower part of FIG. 3 illustrates a state in which the menu bar 225 displayed in the upper right portion of the display unit 150 is moved to an upper left portion of the display unit 150 by the user performing a drag and drop operation. Thus, the display position of the extended function menu 210 is changed from the upper right portion (the lower part of FIG. 2) to the upper left portion (the upper part of FIG. 4) in the display unit 150. Note that the display position of the extended function menu 210 is not limited to the upper right portion or the upper left portion of the display unit 150.

Furthermore, the display position of the extended function menu 210 changed in the lower part of FIG. 3 is stored in the storage unit 120 by the control unit 190, and thereafter, in a case where an extension application is used, the extended function menu 210 is displayed at the stored display position.

Moreover, the display position of the extended function menu 210 may be stored in the storage unit 120 for each first application in association with the first application. This eliminates the need to change the display position of the extended function menu 210 according to the first application to be used each time various first applications are used.

Figure 4:
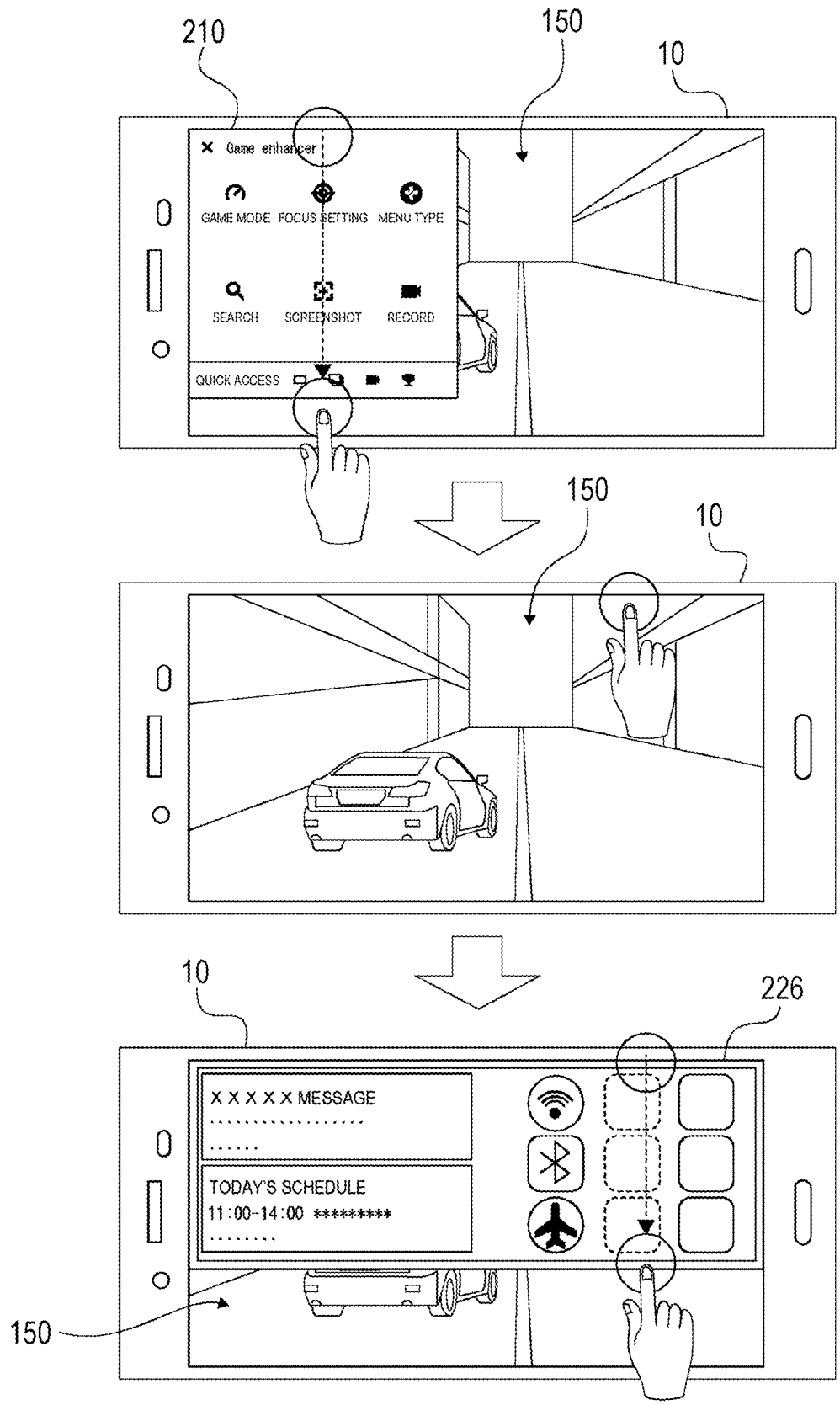
FIG. 4 is an explanatory diagram of the extended function menu display of the embodiment.

FIG. 4 is a diagram illustrating an example of an operation related to menu display of the extension application and the OS according to the present embodiment.

The swipe operation from the screen end as illustrated in the upper part of FIG. 4 may also be used for menu display of the OS. That is, the extended function menu 210 and an OS menu 226 may be executed by the same operation.

In such a case, the control unit 190 performs control such that the extended function menu 210 is preferentially displayed in the swipe operation at a predetermined position (the upper part of FIG. 4), and the OS menu 226 is displayed in the swipe operation at other positions (the middle part and the lower part of FIG. 4).

More specifically, for example, the OS menu 226 is originally displayed even when the swipe operation is performed from any position of the screen end at an upper portion on the display unit 150. However, in a case where it is set by the user that the swipe operation from the upper left portion of the display unit 150 causes display of the extended function menu 210 (FIG. 3), the control unit 190 performs control to display the extended function menu 210 preferentially (the upper part of FIG. 4). On the other hand, in a case of a swipe operation from the upper right portion of the display unit 150, the control unit 190 performs control to display the OS menu 226 (the lower part of FIG. 4). However, strictly speaking, the control unit 190 performs control so as not to display the extended function menu 210, and the display control of the OS menu 226 is left to the OS.

Note that, as a matter of course, in a case where the display position of the extended function menu 210 is set in the upper right portion of the display unit 150, the control unit 190 performs control such that the extended function menu 210 is displayed by a swipe operation from the upper right portion of the display unit 150, and the OS menu 226 is displayed by a swipe operation from the upper left portion.

Furthermore, in a case where the display position of the extended function menu 210 is set to a position other than the upper portion of the display unit 150, the control unit 190 performs control to display the OS menu 226 regardless of the swipe operation performed from any position of the screen end at the upper portion on the display unit 150.

Thus, the extension application can operate so as not to interfere with the user operation on the OS.

Figure 5:
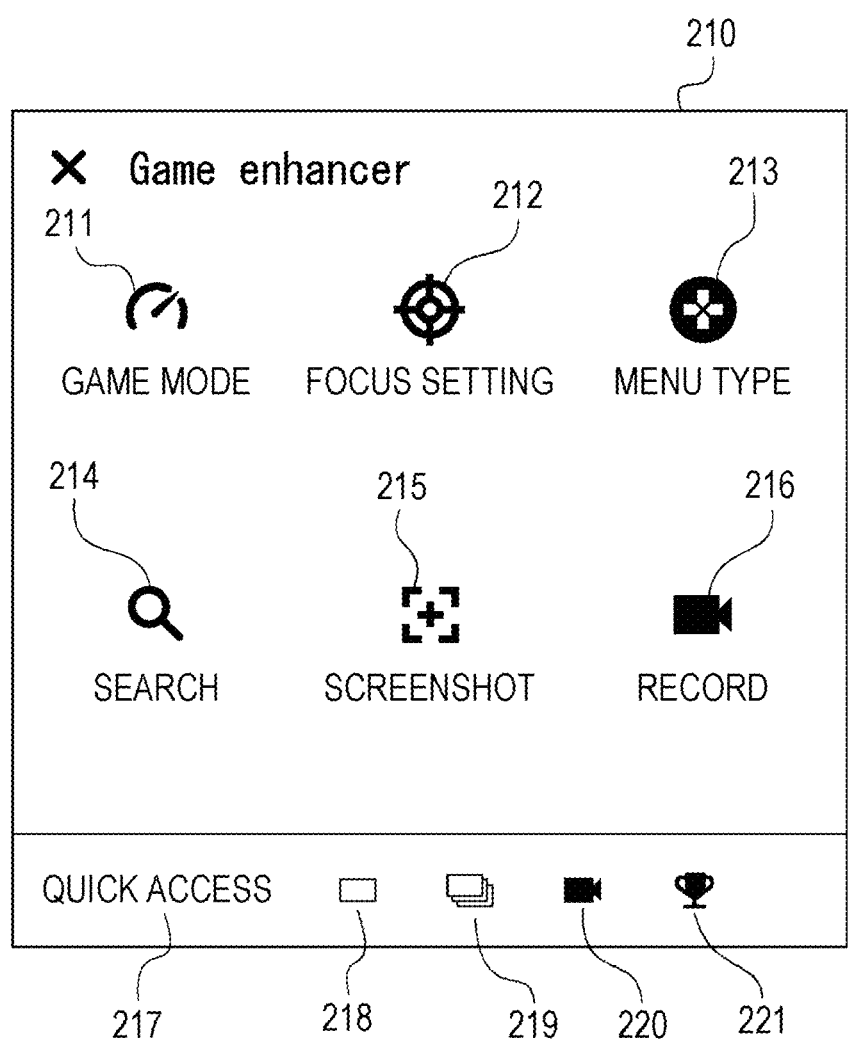
FIG. 5 is an explanatory diagram of contents of the extended function menu of the embodiment.

FIG. 5 is a diagram illustrating an example of a menu of the extension application according to the present embodiment. As illustrated in FIG. 5, the extended function menu 210 of the extension application includes, for example, a game mode region 211, a concentration setting region 212, a menu type region 213, a search region 214, a screenshot region 215, a record region 216, and a quick access region 217.

The game mode region 211 is an operation region that guides a UI for setting a game mode.

The menu type region 213 is an operation region that guides a UI for selecting, for example, a type of menu display such as floating.

The search region 214 is an operation region that guides the UI of search processing.

The screenshot region 215 is an operation region that guides the UI of the screenshot operation.

The record region 216 is an operation region that guides the UI of the operation of recording (or image recording and audio recording).

The concentration setting region 212 is an operation region for concentration setting (also referred to as focus setting). Note that the "focus" in this case means "concentration" or "immersion" of the user. For example, it is concentration in the sense of concentration on a game.

A tap operation or the like on the concentration setting region 212 causes a concentration setting menu 230 (focus setting) described later with reference to FIG. 6 to be displayed.

The quick access region 217 is a region for immediately using various functions from the extended function menu 210. In the example of FIG. 5, an SS icon 218, a continuous shooting SS icon 219, a record icon 220, and a collective restriction icon 221 are arranged in the quick access region 217.

When the user presses the SS icon 218, the control unit 190 images one screenshot (image) of the screen displayed on the display unit 150 via the screen imaging unit 180, and stores the imaged image in the storage unit 120.

When the continuous shooting SS icon 219 is pressed by the user, the control unit 190 continuously images a plurality of screenshots of the screen displayed on the display unit 150 for a certain period of time (what is called burst mode shooting) via the screen imaging unit 180. Then, the control unit 190 generates a data file in a GIF format or the like from a plurality of screenshots imaged within a certain period of time, and stores the data file in the storage unit 120. Thus, it is possible to reduce the file size while maintaining a high frames per second (fps) as compared with a moving image file, and it is easy to grasp a decisive moment at the time of imaging even with a smartphone or the like.

When the record icon 220 is pressed by the user, the control unit 190 performs control to image a moving image of the image displayed on the display unit 150 via the screen imaging unit 180.

Note that in a case where the SS icon 218, the continuous shooting SS icon 219, and the record icon 220 are pressed, the control unit 190 controls the extended function menu 210 to be in a non-display state. Thus, it is possible to prevent the extended function menu 210 from being included in the imaged screenshot.

Figure 6:
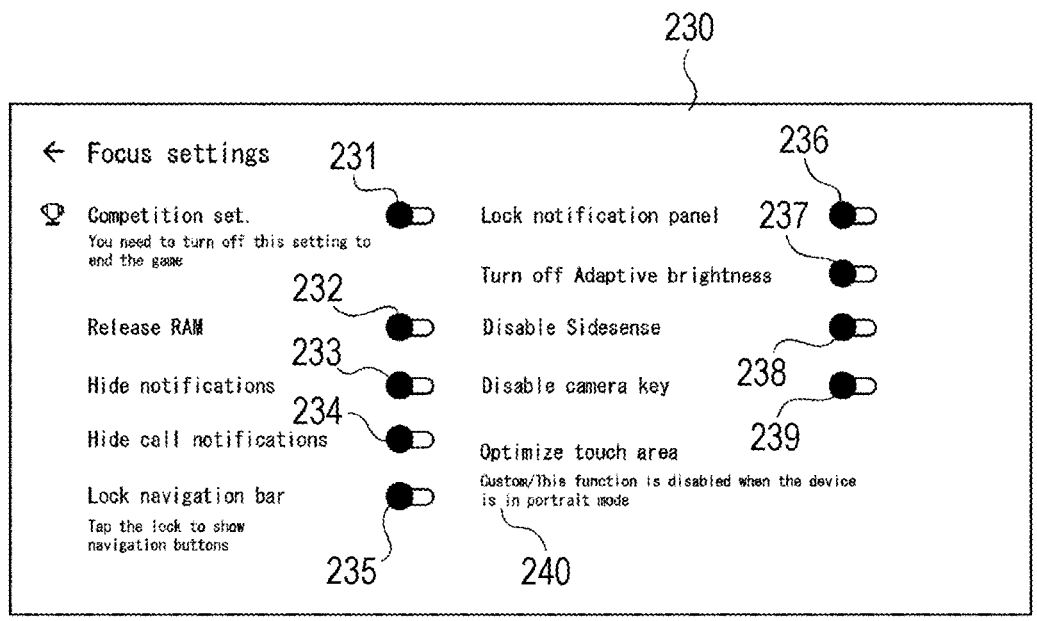
FIG. 6 is an explanatory diagram of a concentration setting menu of the embodiment.

When the collective restriction icon 221 is pressed by the user, the control unit 190 recognizes that an operation similar to a collective restriction operation to be described in FIG. 6 is performed, and performs collective restriction processing of the plurality of functions. This will be described later.

The display content of the extended function menu 210 as illustrated in FIG. 5 is an example and is not limited thereto. It is possible to increase or decrease icons and regions for using various functions that provide extended functions to the first application, and change the arrangement thereof. In particular, various functions executed from the quick access region 217 can be appropriately changed by the user. Furthermore, various shapes, colors, sizes, transmittances, and the like of the extended function menu 210 are conceivable.

FIG. 6 illustrates an example of the concentration setting menu 230 guided from the operation of the concentration setting region 212 in FIG. 5. Note that, in the present embodiment, it is conceivable that the concentration setting menu 230 is also a floating menu.

In the concentration setting menu, setting operators for various functions for enabling the user to concentrate on the first application (for example, a game app) are prepared.

In a case of this example, an example is illustrated in which a collective restriction switch 231, a memory release switch 232, a notification non-display switch 233, an incoming notification non-display switch 234, a navigation bar lock switch 235, a lock notification panel switch 236, an automatic brightness adjustment disable switch 237, a side sensing disable switch 238, a camera key disable switch 239, and a touch area optimization menu 240 are displayed as the operators in the concentration setting menu 230.

FIG. 6 illustrates a case where each switch is turned off.

The types and the number of these operators are merely examples, and some or all of these operators (operation items) may not be provided, or an operator that is not illustrated may be provided.

The memory release switch 232 is an operator that sets whether or not to release the memory of the information processing device 10. Specifically, in a case where an application other than the first application and the extension application is activated in the background, the memory area (RAM area of the storage unit 120) used by the application standby in the background is released. Thus, the operation of the first application can be reduced. In particular, it is preferable in a case where the first application is a game app whose result changes due to heavy operation of the first application.

Note that, in some cases, control may be performed such that a partial area of the memory area used by the extension application is also released by the operation of the memory release switch 232.

The notification non-display switch 233 is an operator that performs function restriction so as to turn off notification on the screen of notification by various applications.

The incoming notification non-display switch 234 is an operator that performs function restriction so as to turn off a function of displaying an incoming notification of a telephone, an electronic mail, a message, or the like on the screen.

The navigation bar lock switch 235 is an operator that performs function restriction so as to lock a navigation bar function.

The lock notification panel switch 236 is an operator that performs function restriction so as to turn off a lock notification panel function.

The automatic brightness adjustment disable switch 237 is an operator that performs function restriction so as to turn off an automatic adjustment function of brightness of the screen.

The side sensing disable switch 238 is an operator that performs function restriction so as to turn off a sensing function in a side region of the screen.

The camera key disable switch 239 is an operator that performs function restriction so as to turn off the operation function of the operation key.

The touch area optimization menu 240 is a menu for optimizing an area in which a touch operation or the like of the user is received. When the touch area optimization menu 240 is operated, a setting screen which is not illustrated is displayed, and the user can set an area in which a touch operation is received or an area in which a touch operation is not received on the setting screen. Thus, for example, setting of an area where an unintended touch operation is performed during a game as a dead zone area, and the like become possible, and the operation of the first application can be appropriately performed. In particular, in a case where there is a touch operation that hinders the operation of the first application, it is no longer necessary to carefully perform an operation so as not to perform such an operation, and thus a comfortable operation environment can be provided.

By arbitrarily turning on/off these operators, the user can turn on/off an arbitrary function during execution of a game by the first application, for example.

However, individually operating these may be a complicated operation.

Figure 7:
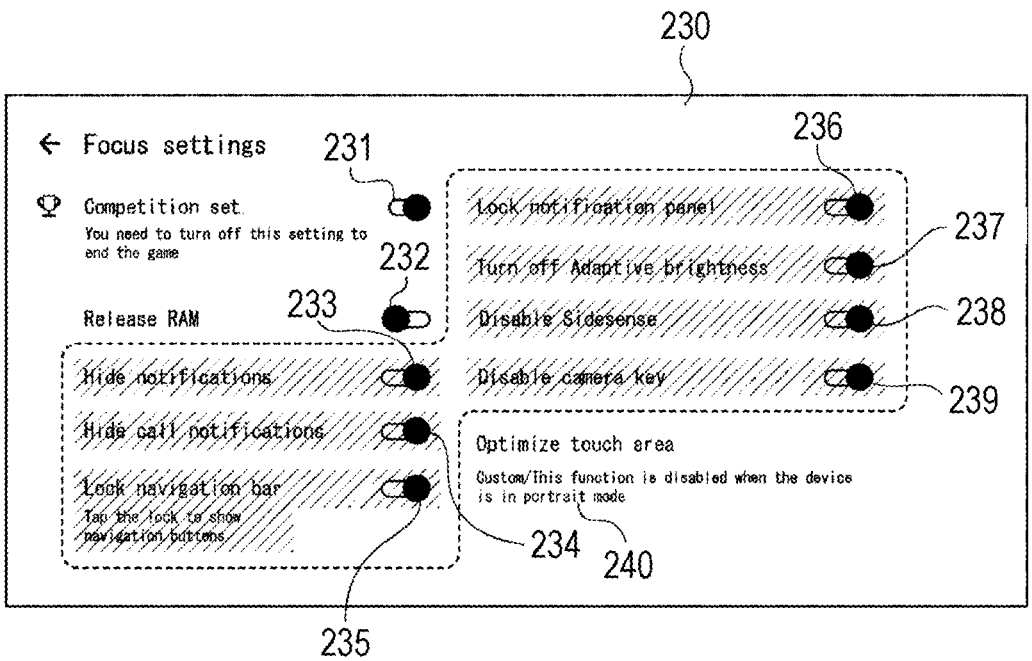
FIG. 7 is an explanatory diagram of a state of collective restriction in the concentration setting menu of the embodiment.

Accordingly, the collective restriction switch 231 is provided, and the plurality of functions can be restricted collectively as illustrated in FIG. 7, for example, by operating the collective restriction switch 231.

In this example, a state is illustrated in which the user turns on the collective restriction switch 231 so that the notification non-display switch 233, the incoming notification non-display switch 234, the navigation bar lock switch 235, the lock notification panel switch 236, the automatic brightness adjustment disable switch 237, the side sensing disable switch 238, and the camera key disable switch 239 are turned on collectively as indicated by a portion surrounded by a broken line.

Furthermore, in this example, each switch turned on by turning on the collective restriction switch 231 is in a grayed-out state (indicated by hatching), and is in a state in which individual operation cannot be performed.

When the user operates the collective restriction switch 231 to turn off from the state of FIG. 7, the state returns to the state of FIG. 6, and the restriction of each function restricted collectively is released. Furthermore, each operator can be individually set to on/off.

Note that the state of FIG. 6 is illustrated as a case where the collective restriction switch 231 is operated to turn off from the state of FIG. 7, but this means that the state returns to the setting state before the collective restriction switch 231 is turned on.

For example, when the collective restriction switch 231 is turned on in a state where only the notification non-display switch 233 is turned on, it becomes the state of FIG. 7, and thereafter, when the collective restriction switch 231 is turned off, it returns to the state where only the notification non-display switch 233 is turned on.

In this way, after the collective function restriction is activated by operating the collective restriction switch 231 after the user individually sets on/off, it is easy to return to the state of individual setting by the user by turning off the collective restriction switch 231.

Note that, as another example, a processing example is conceivable in which when the collective restriction switch 231 is turned off, all the operators indicated in the broken line in FIG. 7 are returned to the off state regardless of the immediately preceding state.

Although the operation of collectively restricting the plurality of functions with the collective restriction switch 231 in the concentration setting menu 230 has been described above, other operation guide lines are prepared.

As described above, the collective restriction icon 221 is provided in the extended function menu 210 of FIG. 5, and by operating the collective restriction icon 221, for example, the function corresponding to the operator illustrated in the broken line portion of FIG. 7 can be in a restricted state.

For example, when the collective restriction icon 221 is operated by tapping or the like, each function is restricted similarly to when the collective restriction switch 231 is turned on. Then, as illustrated in FIG. 8, a collective restriction notification 250 indicating that the function is restricted is displayed so that the user can recognize about the restriction.

The operation using the collective restriction icon 221 is a simpler collective setting operation because the user does not need to perform the operation for displaying the concentration setting menu 230.

Furthermore, when being in a collective restriction state of a plurality of functions, the operation of the collective restriction icon 221 is also an operation of releasing the collective restriction state. That is, this operation can be used as an operation equivalent to that in a case where the collective restriction switch 231 is turned off.

Figure 8:
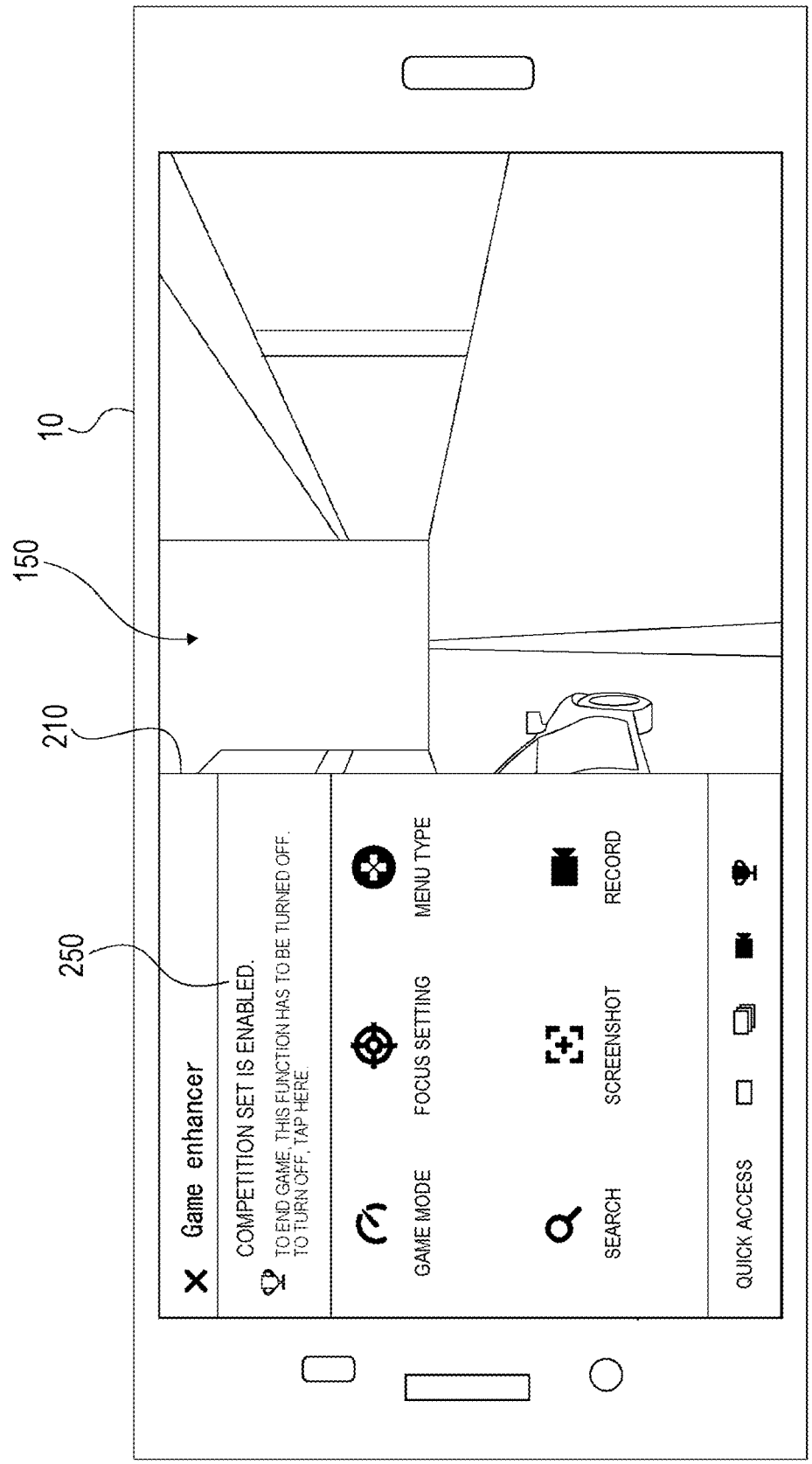
FIG. 8 is an explanatory diagram at a time of collective restriction operation from the extended function menu of the embodiment.

As described above, the collective restriction notification 250 illustrated in FIG. 8 notifies the user of the state in which the collective function restriction is activated, and simultaneously functions as an operator. For example, when a tap operation is performed on the collective restriction notification 250, the collective function restriction is released. At this time, the display of the collective restriction notification 250 also disappears.

In this manner, the user can recognize that the collective function restriction is in an activated state by visually recognizing the collective restriction notification 250, and can release the collective function restriction only by performing a tap operation on the collective restriction notification 250 being visually recognized, and thus it is not necessary to perform an operation of searching for another menu or the like. That is, a user-friendly UI can be provided.

As illustrated in FIG. 6, the concentration setting menu 230 is provided with a collective setting target item which is an item turned on/off in response to the operation of the collective restriction switch 231 and a collective setting non-target item which is an item that can be independently operated regardless of the operation of the collective restriction switch 231.

Examples of the collective setting target items illustrated in FIG. 6 are, as described above, the notification non-display switch 233, the incoming notification non-display switch 234, the navigation bar lock switch 235, the lock notification panel switch 236, the automatic brightness adjustment disable switch 237, the side sensing disable switch 238, and the camera key disable switch 239.

Note that the function to be turned on/off in response to the operation of the collective restriction switch 231 or the collective restriction icon 221 may be other than the items displayed on the concentration setting menu 230. For example, as illustrated in FIG. 4, the user can cause the extended function menu 210 and the OS menu 226 to be displayed by performing a swipe operation from the screen end at the upper portion on the display unit 150, but a gesture operation that is a function of generating a predetermined action by such a predetermined touch operation may be included in the function to be turned on/off. However, in a case where a function that is not displayed in the concentration setting menu 230 is turned on/off in response to the operation of the collective restriction switch 231 or the collective restriction icon 221, for example, when the user operates the collective restriction switch 231 for the first time, and the like, it is desirable to display a caution on the display unit 150 that the gesture operation is also a target of collective on/off.

On the other hand, examples of the collective setting non-target items illustrated in FIG. 6 are the memory release switch 232 and the touch area optimization menu 240. These collective setting non-target items are items whose setting contents are not changed even when the collective restriction switch 231 is operated, and can be operated and individually changed in settings even in the collective restriction state. For example, a setting item for which it is difficult to unconditionally decide whether to turn on or off for all users and a setting item for which three or more setting states exist are set as the collective setting non-target item.

By providing the collective setting non-target items, items whose settings can be changed even in the collective restriction state become clear, and the concentration setting menu 230 becomes user-friendly.

Note that collective setting non-target items other than the exemplified ones may be provided.

The collective restriction state can be released by the above-described various user operations. Moreover, a method of automatically releasing the collective restriction state without depending on the user's operation may be prepared.

For example, in a case where the user leaves the terminal device during execution of the game app as the first application, the screen display of the terminal device may be turned off.

In a case where a certain application is used after the user has returned to the terminal device after a lapse of a certain period of time, if the collective restriction state continues, transition from the first application to another application is not possible, and there is a possibility that convenience of the user is reduced.

In preparation for such a case, the information processing device 10 may have a function of automatically releasing the collective restriction state in a case where a predetermined time has elapsed after the screen display is turned off.

Thus, the user does not need to perform an operation for releasing the collective restriction state when transitioning from the first application to another application, so that the operation burden on the user is reduced.

Furthermore, in a case where the screen display of the information processing device 10 is turned on again after the screen display is turned off, not only a case of using another application but also a case of using the first application again is conceivable. In consideration of such a case, in a case where the collective restriction state is released after a certain period of time has elapsed from when the screen display is turned off, user notification processing for notifying the user that the collective restriction state has been automatically released may be performed at the timing when the next screen display is turned on. Thus, it is possible to prevent the user from erroneously recognizing that the collective restriction state continues, and an operation result for the first application from being an unintended result for the user. Note that, also in a case where the screen display is turned off by the user pressing a button or the like provided as the operation unit 110, similarly, the collective restriction state is released after a predetermined time has elapsed from the time when the screen display is turned off.

2. Manual Setting Processing Example

Figure 9:
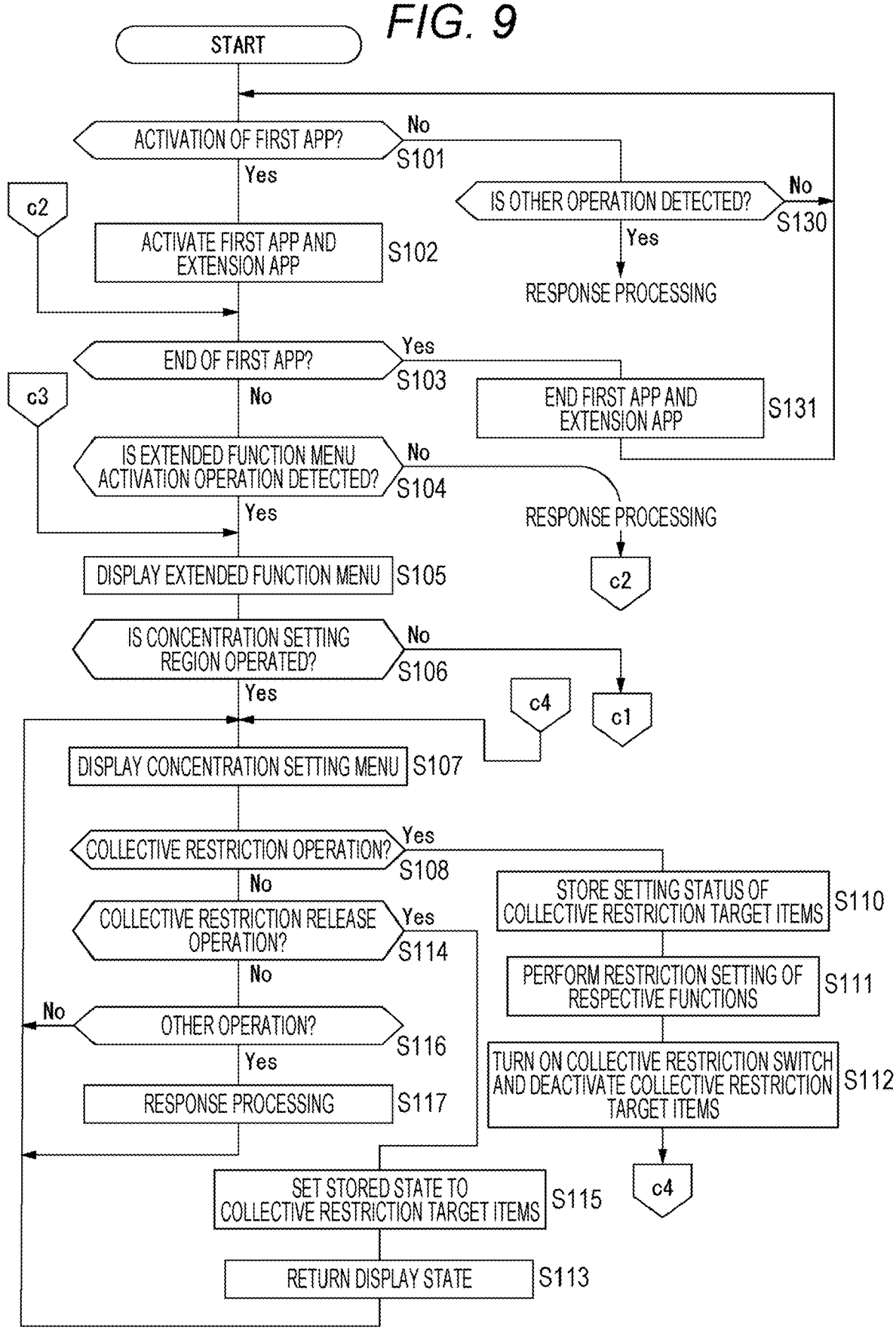
FIG. 9 is a flowchart of processing related to a manual operation of the collective restriction of the embodiment.
Figure 10:
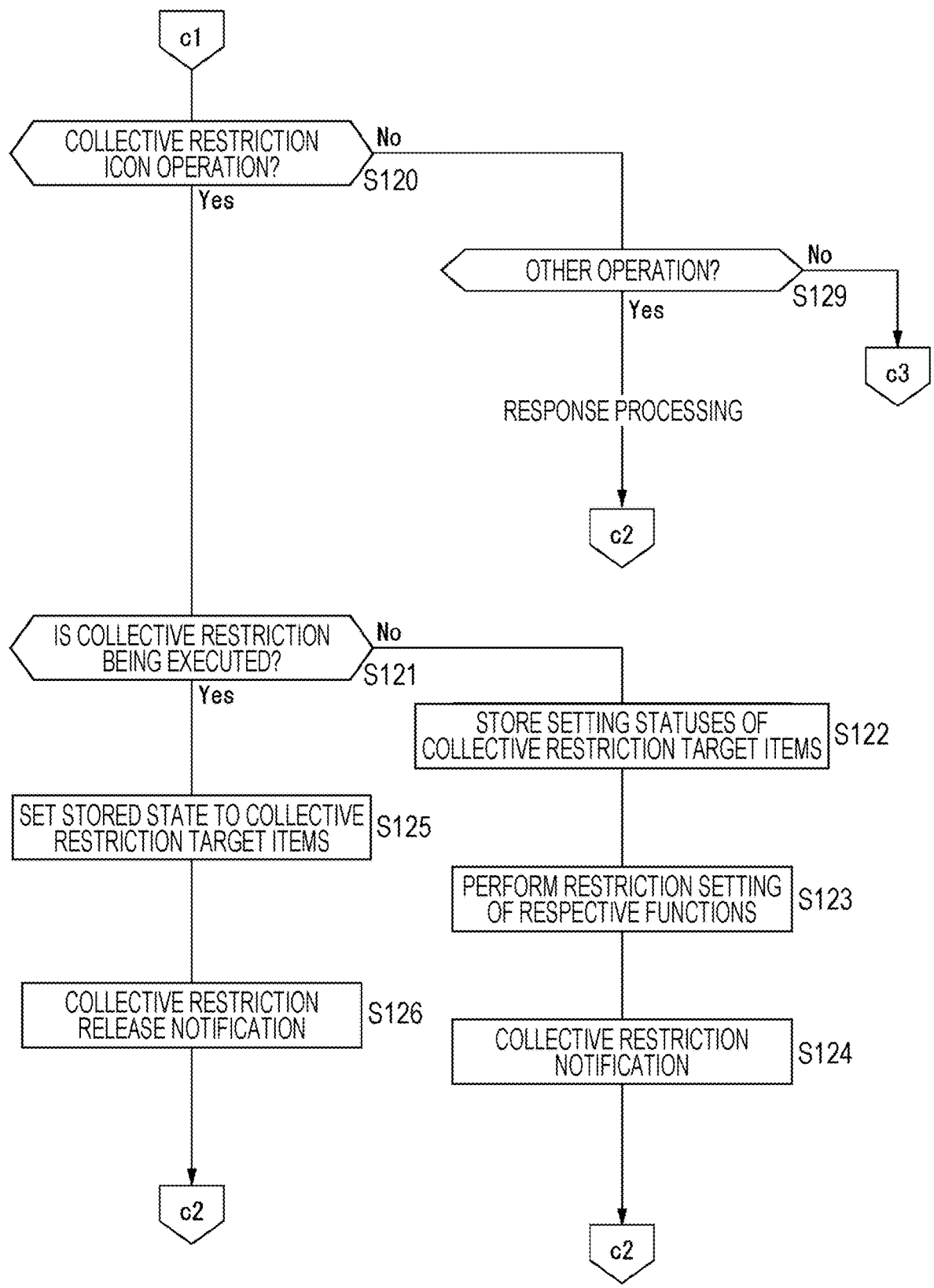
FIG. 10 is a flowchart of processing related to the manual operation of the collective restriction of the embodiment.

A processing example of the control unit 190 related to the collective restriction of the plurality of functions as described above will be described with reference to FIGS. 9 and 10. Note that FIGS. 9 and 10 illustrate a flow related to the collective restriction operation, and do not represent all processes of the control unit 190. FIGS. 9 and 10 illustrate a series of processing flows separately, and connection states of the processing are indicated by "c1", "c2", and "c3".

In step S101, the control unit 190 monitors whether or not it is an activation opportunity for a certain first application. For example, an activation operation of a game app by a user operation is monitored.

In step S130, the control unit 190 monitors other operations and performs response processing in response to an operation.

When an activation opportunity for the first application such as a game app has come, the control unit 190 proceeds to step S102 and activates the first application and the extension application. Then, the processing of step S103 and thereafter is performed.

In step S103, the control unit 190 monitors an end opportunity of the first application. When the end opportunity for the first application has come due to a user operation or another trigger, the control unit 190 proceeds to step S131, ends the first application, and ends the extension application. Then, the processing returns to the monitoring process in steps S101 and S130.

During the activation of the first application, the control unit 190 monitors the activation operation of the extended function menu 210 in step S104. For example, it is an operation of displaying the extended function menu 210 as described with reference to FIGS. 2 to 4.

In a period in which the activation operation is not detected, the processing returns to step S103 while performing other response processing.

In a case where the activation operation of the extended function menu 210 is performed, the control unit 190 performs display control of the extended function menu 210 in step S105.

In the display state of the extended function menu 210, the control unit 190 monitors the operation of the concentration setting region 212 in step S106, monitors the operation of the collective restriction icon 221 in step S120 in FIG. 10, and repeats the processing of returning to step S105 in FIG. 9 while monitoring other operations in step S129.

In addition, in a case where other processing, that is, an operation that can be performed on the extended function menu 210, such as an operation of the game mode region 211, an operation of the menu type region 213, or an operation of the SS icon 218, is detected in step S129 of FIG. 10, the control unit 190 performs processing corresponding to these operations and returns to step S103 of FIG. 9.

In a case where the operation of the concentration setting region 212 is detected in the extended function menu 210, the control unit 190 proceeds from step S106 to step S107 and performs control to display the concentration setting menu 230.

In a state where the concentration setting menu 230 is displayed, the control unit 190 monitors the collective restriction operation by the collective restriction switch 231 in step S108, monitors a collective restriction release operation in step S114, and repeats the processing of returning to step S107 while monitoring other operations such as individual operations in step S116.

The collective restriction operation detected in step S108 is an operation in which the collective restriction switch 231 is turned on in a state in which the collective restriction is not performed as illustrated in FIG. 6.

In this case, the control unit 190 proceeds from step S108 to step S110, and stores the setting status immediately before the operation for the items that are the collective restriction targets. This is for returning to the original individual setting state when the collective restriction is released.

In step S111, setting for collectively restricting functions is performed for a plurality of items that is the target of the collective restriction. The plurality of items refers to functions corresponding to the respective switches (the notification non-display switch 233, the incoming notification non-display switch 234, the navigation bar lock switch 235, the lock notification panel switch 236, the automatic brightness adjustment disable switch 237, the side sensing disable switch 238, and the camera key disable switch 239) indicated by broken lines in FIG. 7.

In step S112, the control unit 190 performs display control so as to change the corresponding switch display to the on state and deactivate (gray out) the region of the corresponding switch display. Consequently, in the collective restriction state, the item of the corresponding function is in a state in which the restriction cannot be individually turned on/off. Then, the processing returns to step S107.

The collective restriction release operation detected in step S114 is an operation in which the collective restriction switch 231 is turned off in a state where the collective restriction is performed as illustrated in FIG. 7.

In this case, the control unit 190 proceeds from step S114 to step S115, and performs processing of returning the items that are the collective restriction targets to the setting state previously stored in step S110 (or step S122 to be described later). Then, in step S113, control to return the display state is performed. That is, the deactivation of the switches of the plurality of items that is the target of the collective restriction is released, and the display returns to the display of the on/off state before the execution of the collective restriction. Then, the processing returns to step S107.

The other operations detected in step S116 are operations of respective switches other than the collective restriction switch 231 in the concentration setting menu 230. For example, the memory release switch 232, the notification non-display switch 233, the incoming notification non-display switch 234, and the like are used.

In a case where any one of these switches is operated, the control unit 190 performs setting processing according to the switch in step S117 and returns to step S107.

Note that, although illustration of processing in a case where the concentration setting menu 230 is closed is omitted, in a case where the concentration setting menu 230 is closed, returning to the display state of the extended function menu 210 may be performed (returning to step S105), or returning to the extended function menu 210 to a closed state may be performed (returning to step S103).

In a case where the operation of the collective restriction icon 221 is detected in step S120 of FIG. 10 in a state where the extended function menu 210 is displayed in step S105, the control unit 190 proceeds to step S121, determines whether or not the collective restriction is currently being executed, and branches the processing.

If the collective restriction has not been executed, the control unit 190 proceeds to step S122 and stores the setting status immediately before the operation with respect to the items that are the collective restriction targets. This is the same processing as step S110, and is storage processing for returning to the original individual setting state when the collective restriction is released.

Then, in step S123, the control unit 190 performs setting for collectively restricting functions for a plurality of items that is the target of the collective restriction. Also in this case, the plurality of items refers to functions corresponding to the respective switches (the notification non-display switch 233, the incoming notification non-display switch 234, the navigation bar lock switch 235, the lock notification panel switch 236, the automatic brightness adjustment disable switch 237, the side sensing disable switch 238, and the camera key disable switch 239) indicated by broken lines in FIG. 7.

In step S124, the control unit 190 performs control to display the collective restriction notification 250 as illustrated in FIG. 8, for example. Then, the processing returns to step S103 in FIG. 9.

In a case where the operation on the collective restriction icon 221 is detected during the execution of the collective restriction, the control unit 190 proceeds from step S121 to step S125 in FIG. 10, and performs processing of returning the items that are the collective restriction targets to the setting state previously stored in step S122 (or step S110). Then, in step S126, control is performed to display a collective restriction release notification (not illustrated) in a display mode such as the collective restriction notification 250 in FIG. 8, for example, and the processing returns to step S103 in FIG. 9.

Note that it is also conceivable not to execute the collective restriction release notification. In a case where the user has not recognized that the collective restriction is being executed, there is a possibility that the user becomes confused because the user cannot perform the desired operation, and thus it is desirable to execute the collective restriction notification.

On the other hand, in a case where the collective restriction is released, the user can perform any operation, and thus there is a low possibility that confusion occurs.

For example, by the processing as illustrated in FIGS. 9 and 10 described above, the control unit 190 performs processing of collectively restricting a plurality of functions or releasing the restriction in response to the user operation.

Thus, the user can collectively restrict unnecessary functions during the game with a simple operation.

3. Learning Processing and Automatic Setting

For example, during execution of a game app, it is conceivable in various ways that the user feels what function is unnecessary. It is also assumed that the function considered to be unnecessary varies depending on the type of a game or a game title, and it is also conceivable that the function considered to be unnecessary varies depending on the usage mode of the individual user, the operation mode according to the game, the situation during execution of the game, and the like.

Thus, for example, it is conceivable to learn the game status from characteristics of the game as the first application and determine the current game status from learning data.

Such processing is assumed to be performed by, for example, a server device capable of communicating with a terminal device on which the user plays a game, but may be performed by, for example, the terminal device.

Figure 11:
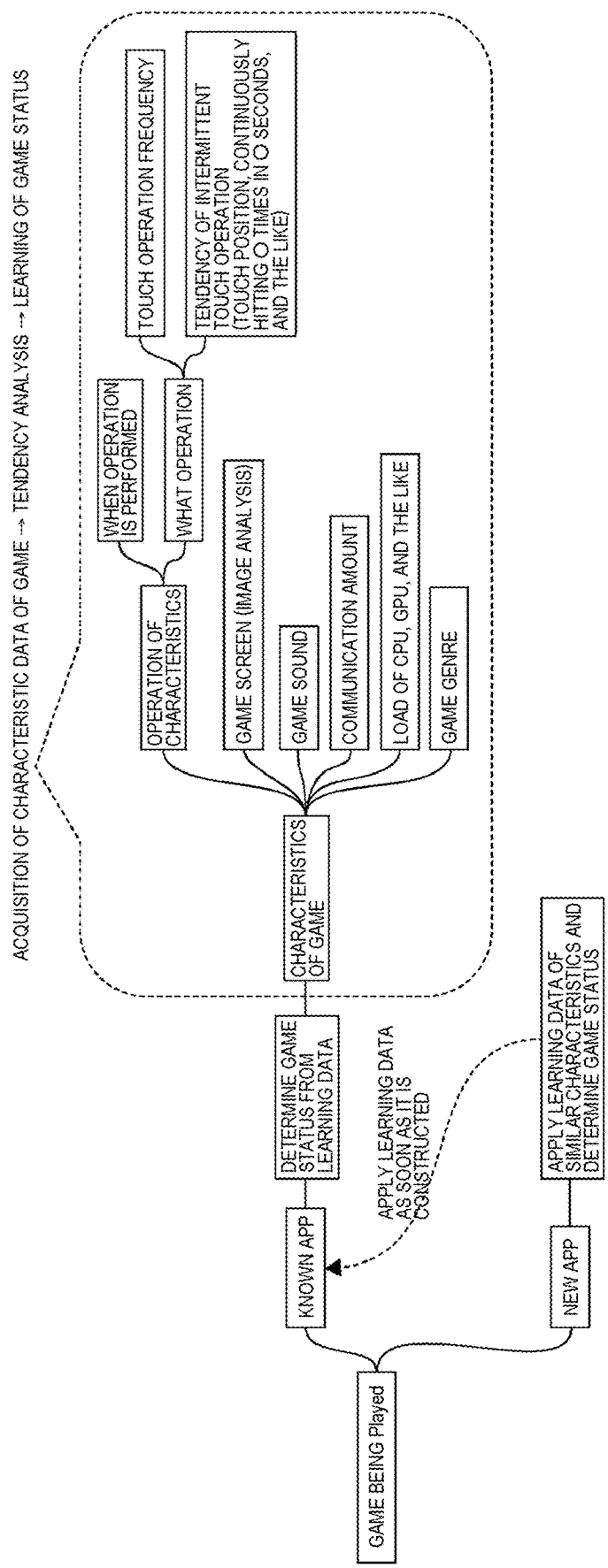
FIG. 11 is an explanatory diagram of learning processing of the embodiment.

FIG. 11 illustrates a concept of learning of a game status.

Now, it is assumed that the server device and the terminal device are communicably connected, and the type, status, and operation content of the game being executed by the terminal device can be acquired.

As the game executed by the terminal device, there are a game as a known app and a game as a new app. Here, the known app refers to a game app in which a certain amount of learning data is collected and a game status can be determined, and the new app refers to a game app that is not in such a state.

In the case of the known app, the game status can be determined on the basis of the learning data during execution. For example, it is also possible to determine a change in the operation content of the user according to the progress of the game, a desirable operation state for the user, and the like.

In the case of a new app, if there is a known app as a similar game, it is possible to determine the game status by applying the learning data. The similar game is assumed to be a game of the same genre such as role playing, fighting, racing, or puzzle, a game having the same series title, or the like.

Alternatively, since the genre for each game may be arbitrarily determined, the tendency of the user's operation on the new app may be detected, and apps having similar operation tendencies may be estimated as similar games.

The characteristics of the game to be learned include a specific operation, a game screen, a game sound, a communication amount, a load of CPU, graphics processing unit (GPU), and the like, a game genre, and the like.

The specific operation is data indicating what kind of user operation is performed in the game. For example, when an operation is performed in the game, what operation is performed, and the like. The information of what kind of operation is, for example, information such as a frequency of touch operation and a tendency of intermittent touch. These are learning data of operability and operation tendencies of the user.

The game screen is information such as luminance, a tendency of change in luminance, a color tendency, and a character type by image analysis of the game screen. It is information such as what kind of screen state is in what kind of game status.

The game sound is information of voice and music used in the game. It is information such as what kind of audio output state is in what kind of game status.

The communication amount is information of a communication amount for executing a game, and is, for example, a change in a communication fee according to a game status, or the like.

The load of the CPU, GPU, and the like is information of the processing load of the game, and is, for example, a change in the processing load according to the game status, and the like.

For example, the server device acquires such game characteristic data from terminal devices of a large number of users for a certain game app. Then, tendency analysis is performed from these pieces of data collected from a plurality of users, and game statuses are learned.

Then, with respect to the game app, it becomes possible to estimate the current game status from the current operation status, image, voice, communication amount, processing load, and the like.

When this is advanced, it is possible to achieve automatic processing according to the game status and improve processing accuracy. For example, in a case of a car race game, it is possible to estimate that, from analysis of a game screen, a game sound, or the like, whether the current game status is a status that a race is being conducted, a status in a phase of selecting a type of the course before the race starts and a type of a car, or a status in a phase of looking for an opponent to race against.

Figure 12:
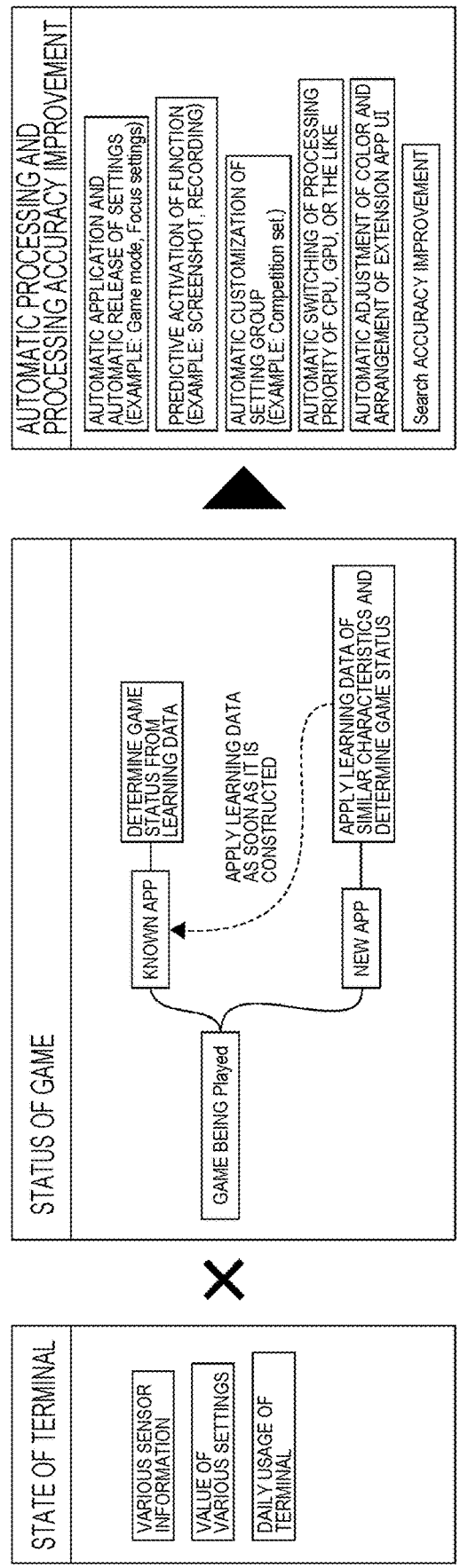
FIG. 12 is an explanatory diagram of automatic processing of function restriction or the like of the embodiment.

FIG. 12 illustrates a concept of automatic processing according to the game status and improvement in processing accuracy.

As the state of the terminal device, there are various sensor information provided in the terminal device, values of various settings, information of daily usage of the terminal device by the user, and the like.

For example, the server device acquires such information from the terminal device for a large number of users. In this way, by using the information obtained from the terminal device and the above-described learning data, it is possible to estimate and determine the current game status.

Then, automatic processing according to the game status and improvement in processing accuracy can be executed. Specifically, as illustrated, Automatic application and automatic release of setting
Predictive activation of function
Customization of setting group
Automatic switching of processing priority of CPU, GPU, and the like
Automatic adjustment of color and arrangement of UI of extension application
Improvement in search accuracy
and the like can be achieved.

The automatic application and automatic release of the setting is processing of automatically applying or releasing a specific setting in a specific status of a specific game.

The predictive activation of a function is processing of predicting and executing an operation function (for example, screenshot imaging or the like) performed by the user in a certain scene of a certain game.

The customization of a setting group is, for example, customization of a plurality of functions applied to the above-described collective restriction setting. For example, it is a setting as to which function is to be collectively set.

The automatic switching of processing priority of the CPU, the GPU, or the like is processing for automatically switching the processing priority according to the game status.

The automatic adjustment of color and arrangement of the UI of the extension application is processing of automatically adjusting the color and arrangement of the extended function menu 210 and the concentration setting menu 230 according to the game status to provide a UI with better usability to the user. For example, the activation operation position of the extended function menu 210 at the screen end as described with reference to FIGS. 2 and 3 is automatically set to an appropriate position without being set by the user.

The improvement in search accuracy is processing of easily obtaining a search result desired by the user by performing search range, filter setting, and the like according to the game status.

By performing such processing, for example, a more comfortable game environment can be provided to the user who uses the game app. Note that, in addition to the configuration in which learning is performed by the server device, a configuration in which learning is performed in the terminal device of each user may be used.

Hereinafter, a specific processing example will be described.

Figure 13:
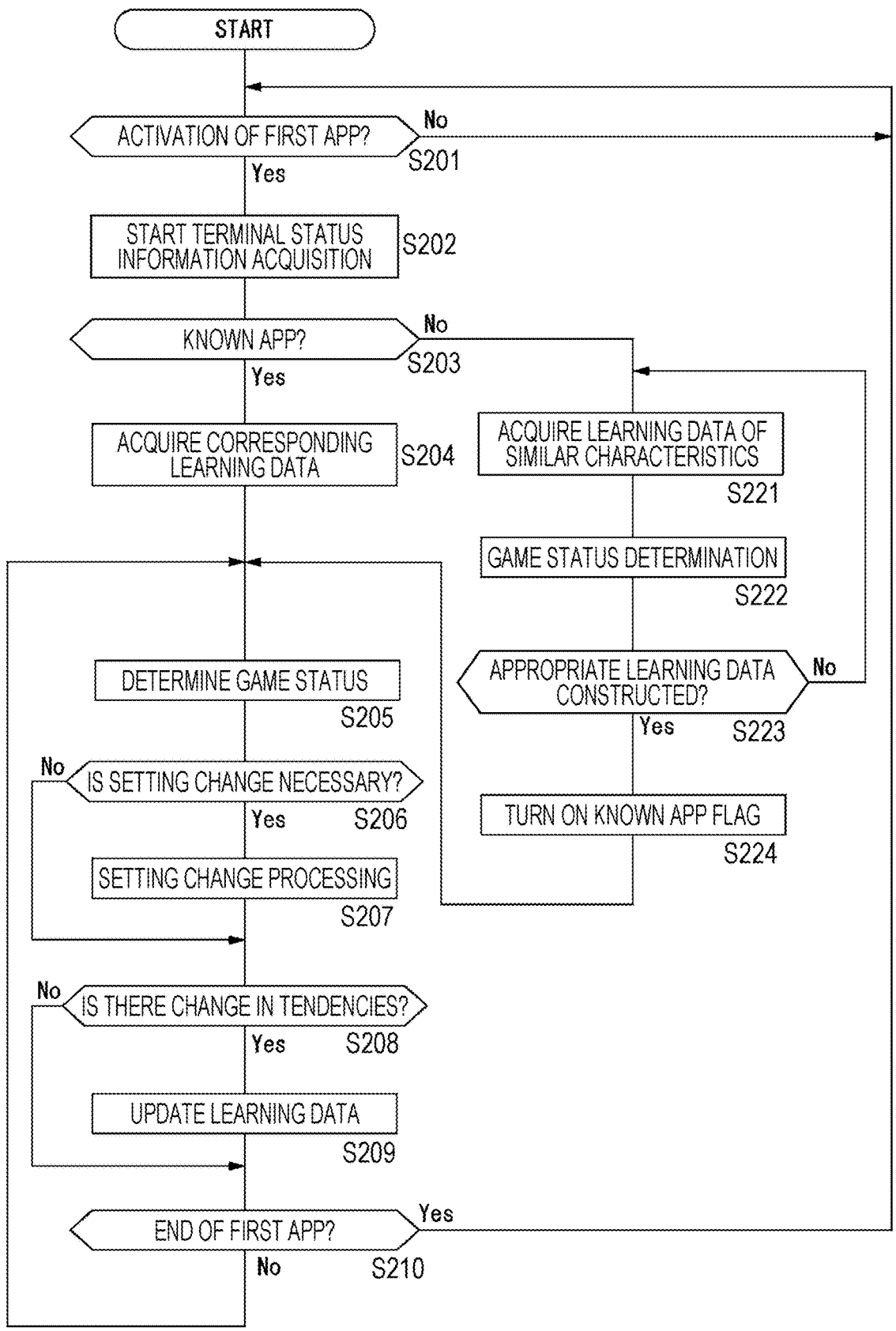
FIG. 13 is a flowchart of the learning processing of the embodiment.

FIG. 13 is an example illustrating learning processing and processing of setting change performed by the server device. This illustrates a processing example in which the server device instructs a setting change or the like based on the learning data while a specific first application is activated in the terminal device.

It is assumed that the server device constantly acquires information from the terminal device by communication with the terminal device. When the first application is activated in the terminal device, the processing proceeds from step S201 to step S202, and acquisition of terminal status information during game activation is started.

In step S203, the server device determines whether the activated first application is a known app or a new app, and branches the processing.

In a case of the known app, the server device proceeds to step S204 and acquires learning data for the app. Note that, in a case where there is learning data of the user who uses the terminal device as learning data for the application, the learning data for the user is acquired. Furthermore, in a case where there is only learning data of another user, that is, in a case where it is a known app but is a new app for the user, the learning data of the another user is acquired.

In step S205, the server device determines the game status from the sequentially acquired terminal status information. The terminal status information mentioned here is, for example, various sensor information and various setting values in FIG. 12, and is assumed to be information indicating the characteristics of the game particularly illustrated in FIG. 11.

The server device can determine the current game status with reference to past learning data by acquiring information indicating current game characteristics.

In step S206, the server device determines whether or not the setting change according to the current game status is necessary in the terminal device. When determining that it is necessary, the server device proceeds to step S207 and performs setting change processing. That is, control data of the setting change is transmitted to the terminal device, and the setting change in the terminal device is executed. Thus, for example, the above-described collective function restriction is automatically activated or released.

In step S208, the server device determines whether or not there is a change in tendencies in user operations, images, voice outputs, and the like in the terminal device. In a case where a tendency change is observed, the server device proceeds to step S209 and performs update processing of the learning data.

In step S210, the server device monitors the end of the first application, and if the first application has not been ended, the server device repeats the processing from step S205. When the end of the first application in the terminal device is detected, the server device returns to step S201.

On the other hand, in a case where it is determined in step S203 that the application is a new app, since there is no corresponding learning data yet, the server device proceeds to step S221 and first acquires learning data of similar characteristics.

Then, while game status determination is performed in step S222, it is determined whether or not appropriate learning data has been constructed in step S223. This is repeated until the learning data has been constructed.

Note that, although not illustrated, the first application may be ended before appropriate learning data has been constructed, and in this case, the processing of the server device returns to step S201.

When determining that the appropriate learning data has been constructed, the server device turns on a known app flag for the first application so that the first application is managed as a known app thereafter, and then proceeds to step S205 and performs the above-described processing thereafter.

For example, by the processing of FIG. 13 described above, automatic setting or the like according to the game status can be performed on the basis of the learning data at the time of execution of the game app or the like. That is, automatic setting adapted to the game is performed.

In particular, regarding the collective restriction setting described above, the function to be limited can be changed according to the game status by the setting change processing in step S207.

For example, it is possible to perform the setting change such that the function of collectively restricting in response to the operation of the collective restriction switch 231 or the collective restriction icon 221 is set to the "notification function", the "incoming notification function", the "brightness adjustment function", and the "locking of the navigation bar" in a certain game status, or the "notification function" and the "incoming notification function" are removed from the collective restriction and set to the "brightness adjustment function" and the "locking of the navigation bar" in a certain game status. For example, in the above-described case of the car race game, in a status that the race is being conducted, the former setting is performed so that the race is not disturbed by the notification function. On the other hand, in a status in a phase of selecting a type of the course before the race starts and a type of a car, or a status in a phase of looking for an opponent to race against, the degree of concentration of the user is relatively low, and thus the latter setting can be performed.

Thus, the content of the function restriction can be changed without an operation burden on the user according to the game status.

Figure 14:
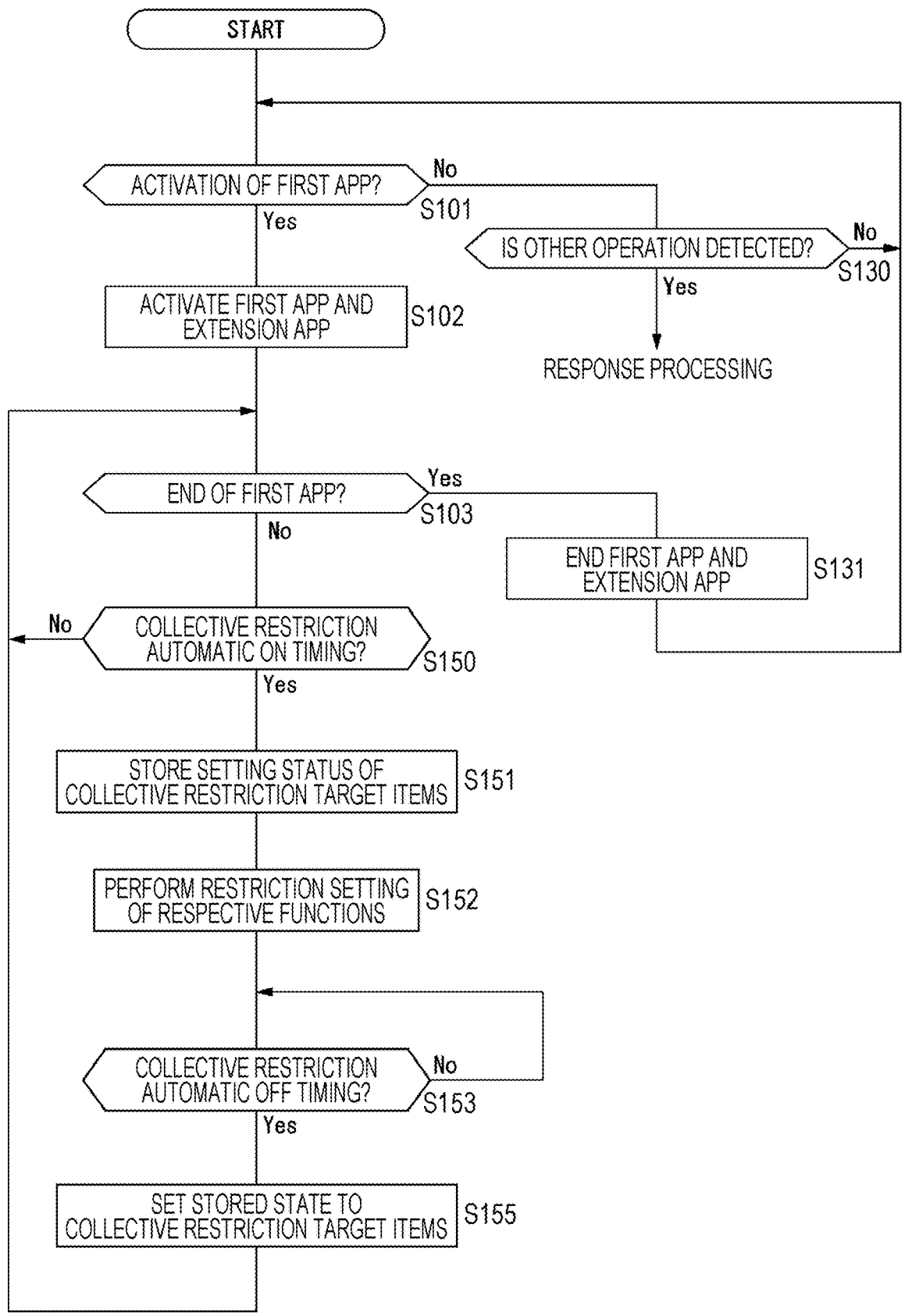
FIG. 14 is a flowchart of processing related to automatic setting of the collective restriction of the embodiment.

Next, FIG. 14 illustrates an example in which the information processing device 10 as a terminal device automatically applies/releases the collective restriction setting according to the game status determination on the basis of an instruction from the server device.

For example, in FIGS. 9 and 10, an example in which the collective restriction is performed or the collective restriction is released in response to the operation of the collective restriction switch 231 or the collective restriction icon 221 has been described, but this is an example in which on/off of the collective restriction is automated according to the game status determination.

Since steps S101, S102, S103, S130, and S131 in FIG. 14 are similar to those in FIG. 9, redundant description is avoided.

In step S150, the control unit 190 determines whether or not it is the timing of automatic setting on of the collective restriction. This is processing of detecting a notification of on of the collective restriction setting from the server.

The server device determines the game status in the terminal device by the processing of FIG. 13 described above. Then, it is possible to determine the timing at which it is better to turn on the collective restriction setting on the basis of the operation tendency of the user according to the game status, and the like. In this case, the terminal device is notified of the control data for which the collective restriction setting is to be turned on.

When detecting the timing of the automatic setting on of the collective restriction by the notification from the server device, the control unit 190 of the terminal device advances the processing to step S151 and stores the setting status immediately before an operation for the items that are the collective restriction targets. This is the same as step S110 in FIG. 9, and is storage processing for returning to the original individual setting state when the collective restriction is released.

Then, in step S152, the control unit 190 performs setting for collectively restricting functions for a plurality of items that is the target of the collective restriction.

In step S153, the control unit 190 determines whether or not it is a timing to release (turn off) the setting of the collective restriction. This is also processing of detecting notification of off of the collective restriction setting from the server device. Since the server device determines the game status in the terminal device, it is possible to determine the timing at which it is better to turn off the collective restriction setting. In this case, the terminal device is notified of the control data for which the collective restriction setting is to be turned off.

When detecting the automatic setting off timing of the collective restriction by the notification from the server device, the control unit 190 of the terminal device advances the processing to step S155 and performs processing of returning the items that are the collective restriction targets to the setting state previously stored in step S151. Then, the processing returns to step S103.

On the other hand, in a case where it is determined that it is not the timing to release (turn off) the setting of the collective restriction, the control unit 190 executes the processing of step S153 again.

For example, by the processing of FIG. 14 described above, the collective restriction setting of a plurality of functions is automatically turned on/off according to the game status even if the user does not perform the operation of the collective restriction setting. For example, in the above-described case of the car race game, the collective restriction setting is controlled to be turned on in a status that the race is being conducted, and the collective restriction setting is controlled to be released (turned off) in other game statuses. In this example, the timing at which the race starts is the timing at which the collective restriction setting is turned on, and the timing at which the race ends is the timing at which the collective restriction setting is released (turned off).

Thus, even if the user is not conscious, unnecessary functions can be restricted during the game.

Note that it is also conceivable to automatically turn on/off the collective restriction setting in consideration of not only the game status but also the user status.

Furthermore, for example, in a case where the user frequently performs an operation using the collective restriction switch 231 or the collective restriction icon 221, such as five times or more a day, the collective restriction icon 221 may be superimposed and displayed on the screen of the game application. Thus, the user can more quickly set the collective restriction on/off.

4. Hardware Configuration Example

A hardware configuration example of the information processing device 10 according to an embodiment of the present disclosure will be described. FIG. 15 is a block diagram illustrating the hardware configuration example of the information processing device 10.

The information processing device 10 includes, for example, a processor 871, a ROM 872, a RAM 873, a host bus 874, a bridge 875, an external bus 876, an interface 877, an input device 878, an output device 879, a storage 880, a drive 881, a connection port 882, and a communication device 883. Note that the hardware configuration illustrated here is an example, and some of the components may be omitted. Furthermore, components other than the components illustrated here may be further included.

(Processor 871)

The processor 871 functions as, for example, an arithmetic processing device or a control device, and controls the overall operation of each component or a part thereof on the basis of various programs and data recorded in the ROM 872, the RAM 873, the storage 880, or a removable recording medium 901.

(ROM 872 and RAM 873)

The ROM 872 is a unit that stores a program read by the processor 871, data used for calculation, and the like. The RAM 873 temporarily or permanently stores, for example, a program read by the processor 871, various parameters that appropriately change when the program is executed, and the like.

(Host Bus 874, Bridge 875, External Bus 876, and Interface 877)

The processor 871, the ROM 872, and the RAM 873 are mutually connected via, for example, the host bus 874 capable of high-speed data transmission. On the other hand, the host bus 874 is connected to the external bus 876 having a relatively low data transmission speed via the bridge 875, for example. Furthermore, the external bus 876 is connected to various components via the interface 877.

(Input Device 878)

As the input device 878, for example, a mouse, a keyboard, a touch panel, a button, a switch, a lever, and the like are used. Moreover, as the input device 878, a remote controller (hereinafter, remote controller) capable of transmitting a control signal using infrared rays or other radio waves may be used. Furthermore, the input device 878 includes a voice input device such as a microphone.

(Output Device 879)

The output device 879 is a device capable of visually or audibly notifying the user of acquired information, such as a display device such as a cathode ray tube (CRT), an LCD, or an organic EL, an audio output device such as a speaker or a headphone, a printer, a mobile phone, or a facsimile, for example. Furthermore, the output device 879 according to the present disclosure includes various vibration devices capable of outputting tactile stimulation.

(Storage 880)

The storage 880 is a device for storing various data. As the storage 880, for example, a magnetic storage device such as a hard disk drive (HDD), a semiconductor storage device, an optical storage device, a magneto-optical storage device, or the like is used.

(Drive 881)

The drive 881 is, for example, a device that reads information recorded on the removable recording medium 901 such as a magnetic disk, an optical disk, a magneto-optical disk, or a semiconductor memory, or writes information on the removable recording medium 901.

(Removable Recording Medium 901)

The removable recording medium 901 is, for example, a DVD medium, a Blu-ray (registered trademark) medium, an HD DVD medium, various semiconductor storage media, or the like. Of course, the removable recording medium 901 may be, for example, an IC card equipped with a non-contact IC chip is mounted, an electronic device, or the like.

(Connection Port 882)

The connection port 882 is a port for connecting an external connection device 902 such as a universal serial bus (USB) port, an IEEE 1394 port, a small computer system interface (SCSI), an RS-232C port, or an optical audio terminal, for example.

(External Connection Device 902)

The external connection device 902 is, for example, a printer, a portable music player, a digital camera, a digital video camera, an IC recorder, or the like.

(Communication Device 883)

The communication device 883 is a communication device for connecting to a network, for example, a wired or wireless LAN, Bluetooth (registered trademark), or a communication card for Wireless USB (WUSB), a router for optical communication, a router for Asymmetric Digital Subscriber Line (ADSL), or a modem for various communications, or the like.

The above configuration of the information processing device 10 can be considered as, for example, a configuration of a terminal device (smartphone or PC) in which the first application is activated. Furthermore, it can also be considered as an information processing device as the above-described server device.

5. Summary and Modification Example

In the above embodiment, the following effects can be obtained.

In the embodiment, a process of changing, during activation of a first application, a plurality of functions of other than the first application executed by the information processing device 10 to a state where collective restriction is performed according to a first condition, and a process of returning to a state before the collective restriction according to a second condition are executed.

By restricting activation of a plurality of functions during execution of a game application, it is possible to provide an environment suitable for the user who wants to concentrate on the game, and it is possible to set a collective restriction state by an easier operation or automatically by the processing of the embodiment. This makes it possible to more easily provide a game environment suitable for the user.

Note that, in the embodiment, an example is provided in which other functions during execution of the game application are collectively restricted, but it is naturally conceivable to perform such collective restriction during execution of other applications. This is because, for example, it may be preferable to enable the collective restriction even in a moving image viewing application, an application for audio recording/image recording, or the like.

In the embodiment, the first condition and the second condition described above are detection of a user operation related to collective restriction (see FIGS. 9 and 10). That is, the collective restriction is executed in response to a user operation, or the collective restriction is ended. Thus, the collective restriction can be executed or ended at timing according to the intention of the user. Processing according to the user's circumstances is achieved.

Note that, in the embodiment, both on and off of the collective restriction setting are performed by the user operation, but only one of the first condition and the second condition described above may be detection of the user operation related to the collective restriction. For example, the collective restriction may be turned on by the on operation of the user, and the collective restriction may be released according to end of the first application (for example, a game). Furthermore, the collective restriction may be turned on in response to start of the first application, and the collective restriction may be released by a user's off operation during a game or the like.

In the embodiment, the extended function menu 210 and the concentration setting menu 230 are superimposed and displayed on an image by the first application, and a collective restriction operator for instructing collective restriction is displayed on these menus. Then, the collective restriction setting is turned on/off by detection of an operation thereof.

For example, in the extended function extended function menu 210 or the concentration setting menu 230 displayed as a floating menu on the screen of the game application, the collective restriction icon 221 and the collective restriction switch 231, which are collective restriction operators, are displayed to enable a user operation. Then, setting of the collective restriction or releasing of the collective restriction setting is performed in response to the user operation.

By enabling an operation on the floating menu, the operation can be performed while the game app is maintained in the foreground, and the operation can be performed so as not to interfere with the progress of the game. Furthermore, by providing the collective restriction operator in the floating menu, favorable operability can be provided.

In the embodiment, an example has been described in which an operation of instructing the collective restriction or an operation of releasing the collective restriction by a user is enabled by a plurality of operation procedures.

By preparing a plurality of lines of procedures as an operation procedure for setting or releasing the collective restriction, the user can perform an operation for the collective restriction according to a preference or a status. For example, in the embodiment, two lines of operation procedures are prepared as a three-step operation procedure of drawing out the extended function extended function menu 210, tapping the concentration setting region 212, and using the collective restriction switch 231, and a two-step operation procedure of drawing out the extended function extended function menu 210 and using the collective restriction icon 221.

Of course, other procedures may be prepared, and for example, it is further conceivable to enable instruction or release of the collective restriction by one tap operation, one specific gesture operation, or the like on the game screen.

In the embodiment, an example has been described in which the first condition for turning on the collective restriction setting is detection of a start timing of a predetermined operation in the first application (see FIG. 14).

Thus, it is possible to activate automatic function restriction without requiring an operation from the user, and it is possible to provide an environment in which the user concentrates on the game.

The timing at which the collective restriction is automatically activated may be an activation timing of the first application itself such as a game, but may be a start timing of the game, a start timing of a specific scene in the game, or the like. Examples thereof include a battle start timing, a start timing for each game stage, a race start timing, and the like.

Of course, various timings are assumed for applications other than the game application. For example, in a case of a video viewing application, a main video start timing is assumed, and in a case of an audio recording/image recording application, a start timing of audio recording or image recording, or the like is assumed.

In the embodiment, an example has been described in which the second condition for releasing the collective restriction is detection of an end timing of a predetermined operation in the first application (see FIG. 14).

Thus, it is possible to automatically release the function restriction without requesting the user to perform the operation, and for example, it is possible to prevent the state in which the user keeps the function restriction from being continued.

The timing at which the collective restriction is released may be an end timing of the first application itself such as a game, but may be an end timing of the game, an end timing of a specific scene in the game, or the like. Examples thereof include a battle end timing, an end timing for each game stage, a race end timing, and the like.

Of course, various timings are assumed for applications other than the game application. For example, in the case of a video viewing application, a main video end timing is assumed, and in the case of an audio recording/image recording application, an end timing of start of audio recording or image recording, or the like is assumed.

In the embodiment, the plurality of functions that is a target of the collective restriction includes a function that causes a transition from the first application to another application.

Thus, for example, by not transitioning to a message app, a call app, a camera app, or the like during a game, it is possible to provide an environment in which it is possible to concentrate on the first application such as a game.

For example, a notification display for notifying that there is a new message includes a function of transitioning to a message app by tapping. Since the function of displaying such a notification is collectively restricted, the user can concentrate on the operation of the first application.

In particular, in a status that many message apps and call apps are installed in the information processing device 10, it is not realistic to restrict the notification display and the like of each app every time, and it is a very troublesome operation. According to this configuration, since such an operation for each app is unnecessary, convenience is very high.

For example, when the notification non-display switch 233, the incoming notification non-display switch 234, the side sensing disable switch 238, the camera key disable switch 239, and the like are turned on, a function of causing a transition to another application directly or indirectly is turned off.

In the embodiment, the plurality of functions that is a target of the collective restriction includes a notification function. For example, the function is a function of notifying reception of an electronic mail or a message or notifying an incoming call.

By preventing notification of an electronic mail, a message, an incoming call, or the like from being performed during a game, it is possible to provide an environment in which it is possible to concentrate on the first application such as a game.

In the embodiment, the plurality of functions that is a target of the collective restriction includes an operation function. For example, during a game, operations of various keys, touch operations, and the like provided in the information processing device 10 (for example, a terminal device) are invalidated. For example, the side sensing disable switch 238, the camera key disable switch 239, and the like are turned on to disable the key operation function and the like.

For example, by preventing a camera operation from being performed or a menu screen from being displayed by a key operation of a terminal device such as a smartphone, a touch operation of a predetermined portion, or the like during a game or the like, it is possible to provide an environment in which it is possible to concentrate on the first application such as a game.

In the embodiment, an example has been described in which the plurality of functions that is a target of the collective restriction is selected on the basis of instruction information corresponding to learning data for each type of the first application (see FIG. 13).

For example, operation statuses of a large number of users are learned for each game type, genre, and the like, and the functions that are the targets of the collective restriction according to the game are customized.

Thus, it is possible to select a function desired to be subjected to function restriction at the time of execution of the game from the operation tendency of the user according to the type, genre, type, and the like of the game, and perform the collective restriction. That is, appropriate function restriction can be achieved according to the status.

The function to be restricted may be changed according to a game status (stage and operation status) or the like. For example, an appropriate function restriction setting is performed for each game status such as during a battle, during movement, during stage transition, or during selection of a game parameter of the game character.

The program of the embodiment is a program for causing the processor 871 of the information processing device 10 as a terminal device to execute the processing of FIGS. 9 and 10 and the processing of FIG. 14.

That is, the program is a program that causes the information processing device 10 to execute a process of changing, during activation of a first application, a plurality of functions of other than the first application executed by the information processing device to a state where collective restriction is performed according to a first condition by manual operation or automatic determination, and a process of returning to a state before the collective restriction according to a second condition by manual operation or automatic determination.

With such a program, the information processing device 10 of the embodiment can be achieved in, for example, a mobile terminal, a personal computer, or other equipment capable of executing information processing.

A program for achieving such an information processing device 10 can be recorded in advance in an HDD as a recording medium built in a device such as a computer device, a ROM in a microcomputer having a CPU, or the like.

Alternatively, the program can be temporarily or permanently stored (recorded) in a removable recording medium such as a flexible disk, a compact disc read only memory (CD-ROM), a magneto optical (MO) disk, a digital versatile disc (DVD), a Blu-ray disc (registered trademark), a magnetic disk, a semiconductor memory, or a memory card. Such a removable recording medium can be provided as what is called package software.

Furthermore, such a program can be installed from the removable recording medium into a personal computer or the like, or can be downloaded from a download site via a network such as a local area network (LAN) or the Internet.

Furthermore, such a program is suitable for providing the information processing device 10 of the embodiment in a wide range. For example, by downloading the program to a mobile terminal device such as a smartphone or a tablet, a mobile phone, a personal computer, a game dedicated device, a video device, a personal digital assistant (PDA), or the like, the smartphone or the like can be caused to function as the information processing device 10 of the present disclosure.

Furthermore, the above points are similar to, for example, a program for causing the processor 871 of the server device to perform the processing of FIG. 13.

Note that effects described in the present description are merely examples and are not limited, and other effects may be provided.

Note that the present technology can employ configurations as follows.

(1)

A program for causing an information processing device to execute:
  a process of changing, during activation of a first application, a plurality of functions of other than the first application executed by the information processing device to a state where collective restriction is performed according to a first condition; and
  a process of returning to a state before the collective restriction according to a second condition.

(2)

The program according to (1) above, in which
  at least one of the first condition or the second condition is detection of a user operation related to collective restriction.

(3)

The program according to (1) or (2) above, in which
  a menu is superimposed and displayed on an image by the first application,
  a collective restriction operator for instructing collective restriction is displayed on the menu, and
  at least one of the first condition or the second condition is detection of a user operation on the collective restriction operator.

(4)

The program according to (2) or (3) above, in which
  an operation of instructing the collective restriction or an operation of releasing the collective restriction by a user is enabled by a plurality of operation procedures.

(5)

The program according to (1) above, in which
  the first condition is detection of a start timing of a predetermined operation in the first application.

(6)

The program according to (1) or (5) above, in which
  the second condition is detection of an end timing of a predetermined operation in the first application.

(7)

The program according to any one of (1) to (6) above, in which
  the plurality of functions that is a target of the collective restriction includes
  a function that causes a transition from the first application to another application.

(8)

The program according to any one of (1) to (7) above, in which
  the plurality of functions that is a target of the collective restriction includes a notification function.

(9)

The program according to any one of (1) to (8) above, in which
  the plurality of functions that is a target of the collective restriction includes an operation function.

(10)

The program according to any one of (1) to (8) above, in which
the plurality of functions that is a target of the collective restriction is selected on the basis of instruction information corresponding to learning data for each type of the first application.

(11)

An information processing device including
a function restriction unit configured to perform a process of changing, during activation of a first application, a plurality of functions of other than the first application executed by the information processing device to a state where collective restriction is performed according to a first condition, and a process of returning to a state before the collective restriction according to a second condition.

(12)

An information processing method for causing an information processing device to perform:
a process of changing, during activation of a first application, a plurality of functions of other than the first application executed by the information processing device to a state where collective restriction is performed according to a first condition; and
a process of returning to a state before the collective restriction according to a second condition.

REFERENCE SIGNS LIST

10 Information processing device
110 Operation unit
120 Storage unit
130 Imaging unit
140 Sensor unit
150 Display unit
160 Voice input unit
170 Audio output unit
180 Screen imaging unit
190 Control unit

The invention claimed is:

1. A non-transitory computer-readable medium storing executable instructions which, when executed by circuitry, cause the circuitry to perform a method, the method comprising:
changing, during activation of a first application, a plurality of functions of other than the first application executed by the circuitry to a state where collective restriction is performed according to a first condition, wherein the first condition is detection of a start timing of a predetermined operation in the first application; and
returning to a state before the collective restriction according to a second condition.

2. The non-transitory computer-readable medium according to claim 1, wherein
at least one of the first condition or the second condition is detection of a user operation related to collective restriction.

3. The non-transitory computer-readable medium according to claim 1, wherein
a menu is superimposed and displayed on an image by the first application,
a collective restriction operator for instructing collective restriction is displayed on the menu, and
at least one of the first condition or the second condition is detection of a user operation on the collective restriction operator.

4. The non-transitory computer-readable medium according to claim 1, wherein
an operation of instructing the collective restriction or an operation of releasing the collective restriction by a user is enabled by a plurality of operation procedures.

5. The non-transitory computer-readable medium according to claim 1, wherein
the second condition is detection of an end timing of a predetermined operation in the first application.

6. The non-transitory computer-readable medium according to claim 1, wherein
the plurality of functions that are a target of the collective restriction include a function that causes a transition from the first application to another application.

7. The non-transitory computer-readable medium according to claim 1, wherein
the plurality of functions that are a target of the collective restriction include a notification function.

8. The non-transitory computer-readable medium according to claim 1, wherein
the plurality of functions that are a target of the collective restriction include an operation function.

9. The non-transitory computer-readable medium according to claim 1, wherein
the plurality of functions that are a target of the collective restriction is selected on a basis of instruction information corresponding to learning data for each type of the first application.

10. An information processing device comprising
circuitry configured to change, during activation of a first application, a plurality of functions of other than the first application executed by the information processing device to a state where collective restriction is performed according to a first condition, wherein the first condition is detection of a start timing of a predetermined operation in the first application, and return to a state before the collective restriction according to a second condition.

11. The information processing device of claim 10, wherein at least one of the first condition or the second condition is detection of a user operation related to collective restriction.

12. The information processing device of claim 10, wherein
a menu is superimposed and displayed on an image by the first application,
a collective restriction operator for instructing collective restriction is displayed on the menu, and
at least one of the first condition or the second condition is detection of a user operation on the collective restriction operator.

13. The information processing device of claim 10, wherein an operation of instructing the collective restriction or an operation of releasing the collective restriction by a user is enabled by a plurality of operation procedures.

14. The information processing device of claim 10, wherein the second condition is detection of an end timing of a predetermined operation in the first application.

15. The information processing device of claim 10, wherein the plurality of functions that are a target of the collective restriction include a function that causes a transition from the first application to another application.

16. An information processing method comprising:
- changing, during activation of a first application, a plurality of functions of other than the first application executed by an information processing device including circuitry to a state where collective restriction is performed according to a first condition, wherein the first condition is detection of a start timing of a predetermined operation in the first application; and
- returning to a state before the collective restriction according to a second condition.

17. The information processing method of claim 16, wherein
- a menu is superimposed and displayed on an image by the first application,
- a collective restriction operator for instructing collective restriction is displayed on the menu, and
- at least one of the first condition or the second condition is detection of a user operation on the collective restriction operator.

18. The information processing method of claim 16, wherein an operation of instructing the collective restriction or an operation of releasing the collective restriction by a user is enabled by a plurality of operation procedures.

19. The information processing method of claim 16, wherein the second condition is detection of an end timing of a predetermined operation in the first application.

20. The information processing method of claim 16, wherein the plurality of functions that are a target of the collective restriction include a function that causes a transition from the first application to another application.

\* \* \* \* \*